(12) United States Patent
Arakawa et al.

(10) Patent No.: US 9,718,259 B2
(45) Date of Patent: *Aug. 1, 2017

(54) MULTILAYER INJECTION-MOLDED BODY

(75) Inventors: Shota Arakawa, Kanagawa (JP); Takafumi Oda, Kanagawa (JP); Ryoji Otaki, Kanagawa (JP); Kentaro Ishii, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 347 days.

This patent is subject to a terminal disclaimer.

(21) Appl. No.: 14/129,040

(22) PCT Filed: Jun. 19, 2012

(86) PCT No.: PCT/JP2012/065644
§ 371 (c)(1),
(2), (4) Date: Dec. 27, 2013

(87) PCT Pub. No.: WO2013/002071
PCT Pub. Date: Jan. 3, 2013

(65) Prior Publication Data
US 2014/0127433 A1   May 8, 2014

(30) Foreign Application Priority Data

Jun. 27, 2011 (JP) .................................. 2011-142158

(51) Int. Cl.
| | |
|---|---|
| B32B 1/02 | (2006.01) |
| B32B 27/08 | (2006.01) |
| B32B 27/32 | (2006.01) |
| B32B 27/34 | (2006.01) |
| C08G 69/26 | (2006.01) |
| C08G 69/36 | (2006.01) |
| B29C 49/08 | (2006.01) |
| B32B 7/12 | (2006.01) |
| B32B 27/24 | (2006.01) |
| B32B 27/30 | (2006.01) |
| B32B 27/36 | (2006.01) |
| B32B 1/08 | (2006.01) |
| B29K 105/00 | (2006.01) |

(52) U.S. Cl.
CPC .............. *B32B 27/08* (2013.01); *B29C 49/08* (2013.01); *B32B 7/12* (2013.01); *B32B 27/24* (2013.01); *B32B 27/306* (2013.01); *B32B 27/32* (2013.01); *B32B 27/34* (2013.01); *B32B 27/36* (2013.01); *C08G 69/265* (2013.01); *C08G 69/36* (2013.01); *B29K 2105/258* (2013.01); *B32B 2250/24* (2013.01); *B32B 2307/518* (2013.01); *B32B 2307/7244* (2013.01); *B32B 2439/02* (2013.01); *B32B 2439/70* (2013.01); *Y10T 428/1352* (2015.01); *Y10T 428/31725* (2015.04)

(58) Field of Classification Search
CPC  B32B 27/08; B32B 27/34; B32B 7/12; B32B 2250/24; B32B 2307/518; Y10T 428/1393; Y10T 428/1352; Y10T 428/31725; B29K 2105/258; C08G 69/265

USPC .............................. 428/34.1, 34.2, 35.7, 35.9
See application file for complete search history.

(56) References Cited

U.S. PATENT DOCUMENTS

| | | | | |
|---|---|---|---|---|
| 4,014,957 | A * | 3/1977 | Kirsch | .................... C08L 77/00 524/538 |
| 4,507,356 | A | 3/1985 | Watabe | |
| 4,844,987 | A | 7/1989 | Hirose et al. | |
| 8,653,225 | B2 * | 2/2014 | Oda | ....................... C08G 69/36 528/328 |
| 8,835,595 | B2 * | 9/2014 | Oda | ....................... C08L 77/06 525/432 |
| 9,156,980 | B2 * | 10/2015 | Bastioli | .................. C08G 63/16 |
| 2006/0014035 | A1 | 1/2006 | Montanari et al. | |
| 2009/0239013 | A1 * | 9/2009 | Otaki | ...................... B32B 27/08 428/36.6 |

FOREIGN PATENT DOCUMENTS

| | | |
|---|---|---|
| EP | 2 562 203 A1 | 2/2013 |
| EP | 2 589 616 A1 | 5/2013 |
| JP | 2-72851 | 3/1990 |
| JP | 3-273027 | 12/1991 |
| JP | 4-90848 | 3/1992 |
| JP | 5-115776 | 5/1993 |
| JP | 2991437 | 12/1999 |
| JP | 2000-254963 | 9/2000 |
| JP | 2003-341747 | 12/2003 |
| JP | 2008-503371 | 2/2008 |
| WO | WO 2011/081099 A1 | 7/2011 |

(Continued)

OTHER PUBLICATIONS

U.S. Appl. No. 14/128,891, filed Dec. 27, 2013, Arakawa, et al.

(Continued)

*Primary Examiner* — Marc A Patterson
(74) *Attorney, Agent, or Firm* — Oblon, McClelland, Maier & Neustadt, L.L.P.

(57) ABSTRACT

A multilayer injection molded article containing a layer (A) containing a polyamide resin (A), and a layer (B) containing a resin (B) as a major component, wherein the polyamide resin (A) contains from 25 to 50% by mol of a diamine unit, which contains a particular diamine unit in an amount of 50% by mol or more; from 25 to 50% by mol of a dicarboxylic acid unit, which contains a particular dicarboxylic acid unit in an amount of 50% by mol or more; and from 0.1 to 50% by mol of a particular constitutional unit.

11 Claims, No Drawings

(56) References Cited

FOREIGN PATENT DOCUMENTS

WO     WO 2011/132456 A1     10/2011
WO     WO2012/090797 A1     7/2012

OTHER PUBLICATIONS

Arvanitoyannis, et al., "Novel copolyamides based on adipic acid, 1,6-hexanediamine and α-amino acids: 2. Study of properties and their biodegradability for food-packaging applications", Polymer, vol. 36, No. 15, 1995, pp. 2957-2967.
Arvanitoyannis, et al., "Novel biodegradable copolyamides based on adipic acid, 1,6 hexane diamine and aminoacids: synthesis and study of properties: Part 1", Studies in Polymer Science 12 (Biodegradable Plastics and Polymers), 1994, pp. 562-569.
International Search Report issued Aug. 14, 2012, in PCT/JP12/065644 filed Jun. 19, 2012.
Extended European Search Report issued Mar. 20, 2015 in Patent Application No. 12803597.9.

\* cited by examiner

MULTILAYER INJECTION-MOLDED BODY

TECHNICAL FIELD

The present invention relates to a multilayer injection molded article that has an oxygen barrier capability and an oxygen absorbing capability, and a container obtained by processing the multilayer injection molded article.

BACKGROUND ART

Injection molding enables production of a molded article having a complicated shape with high productivity, and thus is widely spread for machine parts, automobile parts, electric and electronic parts, food and drug containers and the like. In recent years, various plastic containers have been used as packaging containers owing to the advantages thereof, such as light weight, transparency and good moldability. As a representative plastic container, for example, a container for beverages and the like, an injection molded article having a mouth with a screw shape enabling sufficient plugging with a cap has been frequently used.

Examples of the material used in the injection molded article include a polyolefin, such as polyethylene and polypropylene, and a versatile resin, such as polyester and polystyrene. In particular, an injection molded article using a plastic container (such as a bottle) mainly containing a polyester, such as polyethylene terephthalate (PET), has been widely used for beverages, such as tea, juice beverages and carbonated beverages. The injection molded article mainly containing a thermoplastic resin is excellent as a packaging material, but as being different from a glass bottle and a metal container, it has such a nature that oxygen penetrates from the outside thereof, and thus has a problem remaining in storage stability of the content charged and sealed therein. For imparting the gas barrier property to the injection molded article containing a versatile resin, a multilayer injection molded article having a gas barrier layer as an intermediate layer has been subjected to practical use.

Now a polyamide obtained by polycondensation reaction of xylylenediamine and an aliphatic dicarboxylic acid, for example, a polyamide obtained with m-xylylenediamine and adipic acid (which is hereinafter referred to as nylon MXD6), exhibits a high strength, a high elastic modulus, and a low permeability to a gaseous substance, such as oxygen, carbon dioxide, odors and flavors, and thus is widely used as a gas barrier material in the field of packaging materials. Nylon MXD6 has good heat stability on melting, as compared to other gas barrier resins, and thus can be co-extruded or co-injection molded with a thermoplastic resin, such as polyethylene terephthalate (which is hereinafter abbreviated as PET), nylon 6 and polypropylene. Accordingly, nylon MXD6 is utilized as a gas barrier layer constituting a multilayer structure.

However, even in the case where nylon MXD6 is used as the gas barrier layer, not only oxygen cannot be blocked completely due to the slight oxygen permeability thereof, but also oxygen remaining in the gas in the head space present above the content after charging in the molded article cannot be removed. Accordingly, deterioration of contents that are sensitive to oxygen, such as beer, cannot be avoided. Furthermore, a multilayer molded article obtained by biaxially stretching blow molding of a parison having a three-layer structure of PET resin layer/nylon MXD6 resin layer/PET resin layer or a five-layer structure of PET resin layer/nylon MXD6 resin layer/PET resin layer/nylon MXD6 resin layer/PET resin layer has a problem that it may be more likely to suffer interlayer delamination upon application of impact or upon rapid pressure change after charging a carbonated beverage.

As another measure for imparting the gas barrier property to the injection molded article containing a thermoplastic resin, such a method has been practiced that a gas barrier layer containing an ethylene-vinyl alcohol copolymer, polyacrylonitrile, polyvinylidene chloride, an aluminum foil, a carbon coating, an inorganic oxide vapor deposit, or the like is laminated as a constitutional material, but as similar to the case using nylon MXD6, oxygen remaining in the gas in the head space present above the content after charging in the molded article cannot be removed.

In recent years, a small amount of a transition metal compound is added and mixed with nylon MXD6 to impart an oxygen absorbing capability to nylon MXD6, which is utilized as an oxygen barrier material constituting a container or a packaging material, whereby oxygen penetrating from the outside of the container is absorbed by nylon MXD6, and simultaneously oxygen remaining inside the container is also absorbed by nylon MXD6, thereby further enhancing the storage stability of the content of the container as compared to a container utilizing an ordinary oxygen barrier thermoplastic resin (see, for example, Patent Documents 1 and 2).

An oxygen absorbent has been steadily used for removing oxygen in a container. For example, Patent Documents 3 and 4 disclose an oxygen absorbing multilayer material containing an oxygen absorbent, such as iron powder, dispersed in a resin. Patent Document 5 discloses a product containing an oxygen removing layer containing an ethylenic unsaturated compound, such as polybutadiene, and a transition metal catalyst, such as cobalt, and an oxygen barrier layer, such as polyamide.

In the method of laminating the gas barrier layer as a constitutional material, interlayer delamination and cracks may occur upon application of impact. The formation of interlayer delamination or cracks may cause deterioration of the gas barrier capability, which may impair the commercial value. For addressing the issue, Patent Document 6 discloses improvement of the interlayer delamination resistance in such a manner that upon injecting the resins constituting the innermost layer and the outermost layer into the cavity of the mold finally, a coarsely mixed resin is made to intervene between the layers to form a preform by using a back-flow controlling device capable of making back-flow in a certain amount to the side of the gas barrier layer.

CITATION LIST

Patent Literature

[Patent Document 1] JP-A-2003-341747
[Patent Document 2] Japanese Patent No. 2,991,437
[Patent Document 3] JP-A-2-72851
[Patent Document 4] JP-A-4-90848
[Patent Document 5] JP-A-5-115776
[Patent Document 6] JP-A-2000-254963

SUMMARY OF INVENTION

Technical Problem

An oxygen absorbing multilayer material containing an oxygen absorbent, such as iron powder, dispersed in a resin is opaque since the resin is colored with the oxygen absorbent, such as iron powder, and thus has restrictions in usage, i.e., they may not be used in a field of packaging requiring transparency.

A resin composition containing a transition metal, such as cobalt, has an advantage that the composition may be applied to a packaging container requiring transparency, but is not favorable therefor since the resin composition is colored with the transition metal catalyst. In the resin composition, furthermore, the resin is oxidized through absorption of oxygen by the transition metal catalyst. Specifically, it is considered that the oxidation of nylon MXD6 may occur through such reaction as generation of a radical due to withdrawal of a hydrogen atom of a methylene chain adjacent to an arylene group of the polyamide resin by the transition metal atom, generation of a peroxy radical caused by addition of an oxygen molecule to the radical, and withdrawal of a hydrogen atom by the peroxy radical. The resin is oxidized by oxygen absorption through the aforementioned mechanism, which results in such problems as generation of offensive odor in a content of a container due to decomposition products, deterioration of the color, the strength and the like of the container due to oxidative degradation of the resin, and occurrence of interlayer delamination with the lapse of time.

The method disclosed in Patent Document 6 as a measure for preventing interlayer delamination requires the use of the special device, which may cause problems in economy and practicality.

The problem to be solved by the present invention is to provide a multilayer injection molded article that exhibits an oxygen barrier capability, exhibits an oxygen absorbing capability without a transition metal contained, generates no substance that causes offensive odor or degradation of flavor, is excellent in storage stability of the content, is difficult to cause interlayer delamination upon dropping or application of impact, and has an oxygen absorbing barrier layer suffering considerably small decrease in strength through progress of oxygen absorption.

Solution to Problem

The present invention provides a multilayer injection molded article and a container thereof shown below.
(1) A multilayer injection molded article containing a layer (A) containing a polyamide resin (A), and a layer (B) containing a resin (B) as a major component,
wherein the polyamide resin (A) contains:
from 25 to 50% by mol of a diamine unit, which contains at least one diamine unit selected from the group consisting of an aromatic diamine unit represented by the following general formula (I-1), an alicyclic diamine unit represented by the following general formula (I-2) and a linear aliphatic diamine unit represented by the following general formula (I-3), in an amount in total of 50% by mol or more;
from 25 to 50% by mol of a dicarboxylic acid unit, which contains a linear aliphatic dicarboxylic acid unit represented by the following general formula (II-1) and/or an aromatic dicarboxylic acid unit represented by the following general formula (II-2), in an amount in total of 50% by mol or more; and
from 0.1 to 50% by mol of a constitutional unit represented by the following general formula (III):

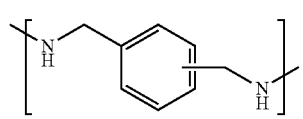
(I-1)

-continued

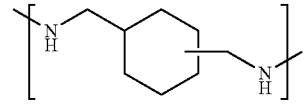
(I-2)

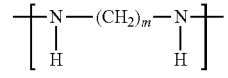
(I-3)

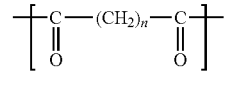
(II-1)

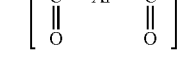
(II-2)

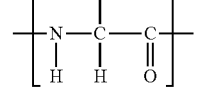
(III)

wherein,
in the general formula (I-3), m represents an integer of from 2 to 18;
in the general formula (II-1), n represents an integer of from 2 to 18;
in the general formula (II-2), Ar represents an arylene group; and
in the general formula (III), R represents a substituted or unsubstituted alkyl group or a substituted or unsubstituted aryl group.
(2) A container obtained by processing the multilayer injection molded article.

Advantageous Effects of Invention

The multilayer injection molded article of the present invention exhibits an oxygen barrier capability, exhibits an oxygen absorbing capability without a transition metal contained, is difficult to cause interlayer delamination upon dropping and application of impact, and has an oxygen absorbing barrier layer suffering considerably small decrease in strength through progress of oxygen absorption. Even in utilization for a prolonged period of time, the oxygen absorbing barrier layer maintains the strength thereof, and thus interlayer delamination is difficult to occur.

The container obtained by processing the multilayer injection molded article is excellent in suppression of oxidative degradation of the content thereof, generates substantially no substance that causes offensive odor or degradation of flavor, and thus is excellent in flavor retaining property.

DESCRIPTION OF EMBODIMENTS

<<Multilayer Injection Molded Article>>

The multilayer injection molded article of the present invention contains at least a layer (A) containing a polyamide resin (A) (which may be hereinafter referred to as an oxygen absorbing barrier layer), and a layer (B) containing a resin (B) as a major component.

The layer structure of the multilayer injection molded article of the present invention is not particularly limited, and the numbers and kinds of the layer (A) and the layer (B) are not particularly limited. For example, an A/B structure containing one layer of the layer (A) and one layer of the layer (B) may be used, and a three-layer structure of B/A/B containing one layer of the layer (A) and two layers of the layer (B) may be used. A five-layer structure B1/B2/A/B2/B1 containing one layer of the layer (A) and two kinds and four layers of the layer (B1) and the layer (B2) may be used. The multilayer injection molded article of the present invention may further contain an optional layer, such as an adhesive layer (AD), depending necessity, and for example, a seven-layer structure B1/AD/B2/A/B2/AD/B1 may be used.

1. Layer (A) Containing Polyamide Resin (A) (Oxygen Absorbing Barrier Layer)

In the present invention, the oxygen absorbing barrier layer exhibits an oxygen absorbing capability and an oxygen barrier capability by using the particular polyamide resin described later (which may be hereinafter referred to as a polyamide resin (A)) contained. The polyamide resin (A) contained in the oxygen absorbing barrier layer may be only one kind or a combination of two or more kinds thereof.

In the present invention, the oxygen absorbing barrier layer contains the polyamide resin (A) as a major resin component. The oxygen absorbing barrier layer may contain a resin other than the polyamide resin (A), but the proportion of the polyamide resin (A) occupied in the total resins of the oxygen absorbing barrier layer preferably exceeds 95% by mass. The resin contained in the oxygen absorbing barrier layer may be only the polyamide resin (A), and the proportion of the polyamide resin (A) occupied in the total resins of the oxygen absorbing barrier layer is preferably 100% by mass or less.

The oxygen absorbing barrier layer may contain a resin other than the polyamide resin (A) as described above, and as the additional resin, various known resins may be used depending on the capability to be imparted to the oxygen absorbing barrier layer, in such a range that does not impair the advantages of the present invention.

For example, an aliphatic polyamide and/or an amorphous semi-aromatic polyamide having a high water absorbing rate may be preferably used from the standpoint of imparting the interlayer delamination resistance, the impact resistance and the flexibility. Examples of the compound that imparts the interlayer delamination resistance include a polyvinylamine, a amino-functional polyacrylamide, a polydiallyldimethylammonium chloride, a polyvinylpyrrolidone copolymer, a polyethyleneimine, a polypropyleneimime, a reaction product of ethylenediamine and epichlorohydrin, and a phenoxy resin.

Examples of the aliphatic polyamide include homopolymers, such as (6-aminohexanoic acid) (nylon 6), which is also known as poly(caprolactam), poly(hexamethylene adipamide) (nylon 6,6), poly(7-aminoheptanoic acid) (nylon 7), poly(10-aminodecanoic acid) (nylon 10), poly(11-aminoundecanoic acid) (nylon 11), poly(hexamethylene sebacamide) (nylon 6,10), poly(hexamethylene azelamide) (nylon 6,9), and poly(tetramethylene adipamide) (nylon 4,6), and aliphatic polyamides, such as a caprolactam/hexamethylene adipamide copolymer (nylon 6/6,6) and a hexamethylene adipamide/caprolactam copolymer (nylon 6,6/6). Among these, nylon 6 and nylon 6,6 are particularly preferably used.

Examples of the amorphous semi-aromatic polyamide include poly(hexamethylene isophthalamide) (nylon 6I), a hexamethylene isophthalamide/hexamethylene terephthalamide copolymer (nylon 6I/6T), poly(m-xylylene isophthalamide) (nylon MXDI), a caprolactam/m-xylylene isophthalamide copolymer (nylon 6/MXDI) and a caprolactam/hexamethylene isophthalamide copolymer (nylon 6/6I). Among these, nylon 6I/6T is particularly preferably used.

Upon adding only the aliphatic polyamide as the polyamide resin (A), a problem may occur upon molding a bottle in some cases due to the increase of the crystallization rate depending on the kind and addition amount thereof. Upon adding only the amorphous semi-aromatic polyamide as the polyamide resin (A), a problem may occur upon molding a bottle in some cases due to the decrease of the crystallization rate depending on the kind and addition amount thereof. Accordingly, simultaneous addition of the aliphatic polyamide and the amorphous semi-aromatic polyamide as the polyamide resin (A) may be preferably frequently practiced.

The mass of the aliphatic polyamide and the amorphous semi-aromatic polyamide is preferably from 1 to 5% by mass based on the mass of the barrier layer. When the mass is in the range, the multilayer bottle may be favorably molded, and the resulting molded article has excellent interlayer delamination resistance and good barrier property.

The aliphatic polyamide, such as nylon 6, may be copolymerized with the polyamide resin (A), whereby imparting the interlayer delamination resistance, the impact resistance and the flexibility thereto.

Examples of the additional resin include a polyolefin such as polyethylene and polypropylene, and modified products thereof, and a thermoplastic elastomer such as a polyolefin elastomer, a polyamide elastomer, a styrene-butadiene copolymer resin and a hydrogenised product thereof, and a polyester elastomer, from the standpoint of imparting impact resistance, flexibility and adhesiveness thereto.

Examples of the additional resin also include a carbon-carbon unsaturated double bond-containing resin such as polybutadiene and modified polybutadiene, from the standpoint of further imparting an oxygen absorbing capability thereto.

The additional resin may be only one kind or a combination of two or more kinds thereof. The proportion of the additional resin occupied in the total resins of the oxygen absorbing barrier layer is preferably 5% by mass or less.

The oxygen absorbing barrier layer may contain, in addition to the polyamide resin (A), an additive (which may be hereinafter referred to as an additive (C)) described later according to the desired capability, the content of the polyamide resin (A) in the oxygen absorbing barrier layer is preferably from 90 to 100% by mass, and more preferably from 95 to 100% by mass, from the standpoint of the molding processability, the oxygen absorbing capability and the oxygen barrier capability.

The thickness of the oxygen absorbing barrier layer is preferably from 2 to 100 μm, more preferably from 5 to 90 μm, and further preferably from 10 to 80 μm, from the standpoint of ensuring the properties including the flexibility that are demanded for the multilayer injection molded article while enhancing the oxygen absorbing capability and the oxygen barrier capability.

1-1. Polyamide Resin (A)

<Constitution of Polyamide Resin (A)>

In the present invention, the polyamide resin (A) contains: from 25 to 50% by mol of a diamine unit, which contains at least one diamine unit selected from the group consisting of an aromatic diamine unit represented by the following general formula (I-1), an alicyclic diamine unit represented by the following general formula (I-2) and a linear aliphatic diamine unit represented by the following general formula (I-3), in an amount in total of 50% by mol or more; from 25 to 50% by mol of a dicarboxylic acid unit, which contains a linear aliphatic dicarboxylic acid unit represented by the following general formula (II-1) and/or an aromatic dicarboxylic acid unit represented by the following general formula (II-2), in an amount in total of 50% by mol or more; and from 0.1 to 50% by mol of a tertiary hydrogen-containing carboxylic acid unit (preferably, a constitutional unit represented by the following general formula (III)):

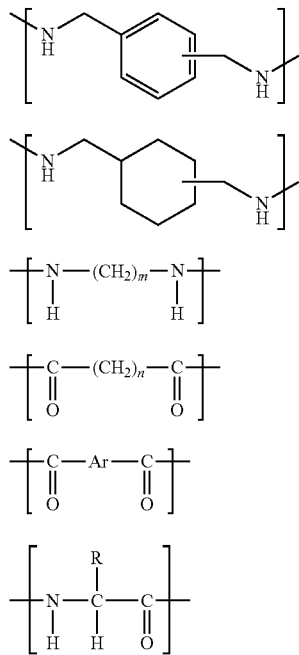

wherein, in the general formula (I-3), m represents an integer of from 2 to 18; in the general formula (II-1), n represents an integer of from 2 to 18; in the general formula (II-2), Ar represents an arylene group; and in the general formula (III), R represents a substituted or unsubstituted alkyl group or a substituted or unsubstituted aryl group.

The total content of the diamine unit, the dicarboxylic acid unit and the tertiary hydrogen-containing carboxylic acid unit does not exceed 100% by mol. The polyamide resin (A) may further contain a constitutional unit other than those mentioned above in such a range that does not impair the advantages of the present invention.

In the polyamide resin (A), the content of the tertiary hydrogen-containing carboxylic acid unit is from 0.1 to 50% by mol. When the content of the tertiary hydrogen-containing carboxylic acid unit is less than 0.1% by mol, a sufficient oxygen absorbing capability is not exhibited. When the content of the tertiary hydrogen-containing carboxylic acid unit exceeds 50% by mol, the properties of the polyamide resin (A), such as the gas barrier property and the mechanical property, are deteriorated since the amount of tertiary hydrogen contained is too large, and particularly in the case where the tertiary hydrogen-containing carboxylic acid is an amino acid, not only the heat resistance becomes insufficient due to a continuous peptide chain, but also a ring structure formed of a dimer of the amino acid is produced and inhibits the polymerization. The content of the tertiary hydrogen-containing carboxylic acid unit is preferably 0.2% by mol or more, and more preferably 1% by mol or more, and is preferably 40% by mol or less, and more preferably 30% by mol or less, from the standpoint of the oxygen absorbing capability and the properties of the polyamide resin (A).

In the polyamide resin (A), the content of the diamine unit is from 25 to 50% by mol, and from the standpoint of the oxygen absorbing capability and the properties of the polymer, is preferably from 30 to 50% by mol. In the polyamide resin (A), similarly, the content of the dicarboxylic acid unit is from 25 to 50% by mol, and preferably from 30 to 50% by mol.

The ratio of the contents of the diamine unit and the dicarboxylic acid unit is preferably approximately the same amounts, and more preferably the content of the dicarboxylic acid unit is ±2% by mol of the content of the diamine unit, from the standpoint of the polymerization reaction. When the content of the dicarboxylic acid unit deviates from the range of ±2% by mol of the content of the diamine unit, it is difficult to increase the polymerization degree of the polyamide resin (A), and a long period of time is required for increasing the polymerization degree, which may cause thermal degradation.

[Diamine Unit]

The diamine unit in the polyamide resin (A) contains at least one diamine unit selected from the group consisting of an aromatic diamine unit represented by the general formula (I-1), an alicyclic diamine unit represented by the general formula (I-2) and a linear aliphatic diamine unit represented by the general formula (I-3), in an amount in total of 50% by mol or more based on the diamine units, and the content thereof is preferably 70% by mol or more, more preferably 80% by mol or more, and further preferably 90% by mol or more, and is preferably 100% by mol or less.

Examples of the compound capable of constituting the aromatic diamine unit represented by the general formula (I-1) include o-xylylenediamine, m-xylylenediamine and p-xylylenediamine. These compounds may be used solely or as a combination of two or more kinds thereof.

Examples of the compound capable of constituting the alicyclic diamine unit represented by the general formula (I-2) include a bis(aminomethyl)cyclohexane compound, such as 1,3-bis(aminomethyl)cyclohexane and 1,4-bis (aminomethyl)cyclohexane. These compounds may be used solely or as a combination of two or more kinds thereof.

The bis(aminomethyl)cyclohexane compound has structural isomers, and good moldability with high crystallinity may be obtained by increasing the content of the cis-isomer. On the other hand, when the content of the cis-isomer is decreased, a transparent article having low crystallinity may be obtained. Therefore, in the case where the crystallinity is to be increased, the content of the cis-isomer in the bis (aminomethyl)cyclohexane compound is preferably 70% by mol or more, more preferably 80% by mol or more, and further preferably 90% by mol or more. In the case where the crystallinity is to be decreased, the content of the cis-isomer in the bis(aminomethyl)cyclohexane compound is preferably 50% by mol or less, more preferably 40% by mol or less, and further preferably 30% by mol or less.

In the general formula (I-3), m represents an integer of from 2 to 18, preferably from 3 to 16, more preferably from 4 to 14, and further preferably from 6 to 12.

Examples of the compound capable of constituting the linear aliphatic diamine unit represented by the general formula (I-3) include an aliphatic diamine, such as ethylenediamine, 1,3-propylenediamine, tetramethylenediamine, pentamethylenediamine, hexamethylenediamine, heptamethylenediamine, octamethylenediamine, nonamethylenediamine, decamethylenediamine, undecamethylenediamine and dodecamethylenediamine, but are not limited thereto. Among these, hexamethylenediamine is preferred. These compounds may be used solely or as a combination of two or more kinds thereof.

The diamine unit in the polyamide resin (A) preferably contains the aromatic diamine unit represented by the general formula (I-1) and/or the alicyclic diamine unit represented by the general formula (I-2) from the standpoint of imparting excellent gas barrier property to the polyamide resin (A), and enhancing the transparency and the color tone and improving the moldability as a versatile thermoplastic resin, and preferably contains the linear aliphatic diamine unit represented by the general formula (I-3) from the standpoint of imparting suitable crystallinity to the polyamide resin (A). In particular, the diamine unit preferably contains the aromatic diamine unit represented by the general formula (I-1) from the standpoint of the oxygen absorbing capability and the properties of the polyamide resin (A).

The diamine unit in the polyamide resin (A) preferably contains a m-xylylenediamine unit in an amount of 50% by mol or more from the standpoint of exhibiting the excellent gas barrier property by the polyamide resin (A), and improving the moldability as a versatile thermoplastic resin, and the content thereof is preferably 70% by mol or more, more preferably 80% by mol or more, and further preferably 90% by mol or more, and is preferably 100% by mol or less.

Examples of the compound capable of constituting other diamine units than the diamine unit represented by one of the general formulae (I-1) to (I-3) include an aromatic diamine such as p-phenylenediamine, an alicyclic diamine such as 1,3-diaminocyclohexane and 1,4-diaminocyclohexane, an aliphatic diamine such as N-methylethylenediamine, 2-methyl-1,5-pentanediamine and 1-amino-3-aminomethyl-3,5,5-trimethylcyclohexane, and a polyether diamine having an ether bond represented by Jeffamine and Elastamine (both trade names), produced by Huntsman International LLC, but are not limited thereto. These compounds may be used solely or as a combination of two or more kinds thereof.

[Dicarboxylic Acid Unit]

The dicarboxylic acid unit in the polyamide resin (A) contains a linear aliphatic dicarboxylic acid unit represented by the following general formula (II-1) and/or an aromatic dicarboxylic acid unit represented by the following general formula (II-2), in an amount in total of 50% by mol or more based on the dicarboxylic acid units, from the standpoint of the reactivity upon polymerization, and the crystallinity and the moldability of the polyamide resin (A), and the content thereof is preferably from 70% by mol or more, more preferably 80% by mol or more, and further preferably 90% by mol or more, and is preferably 100% by mol or less.

The linear aliphatic dicarboxylic acid unit represented by the general formula (II-1) is preferred for imparting a suitable glass transition temperature and crystallinity to the polyamide resin (A), and for imparting thereto flexibility that is required for a packaging material and a packaging container.

In the general formula (II-1), n represents an integer of from 2 to 18, preferably from 3 to 16, more preferably from 4 to 12, and further preferably from 4 to 8.

Examples of the compound capable of constituting the linear aliphatic dicarboxylic acid unit represented by the general formula (II-1) include succinic acid, glutaric acid, adipic acid, pimelic acid, suberic acid, azelaic acid, sebacic acid, 1,10-decanedicarboxylic acid, 1,11-undecanedicarboxylic acid and 1,12-dodecanedicarboxylic acid, but are not limited thereto. These compounds may be used solely or as a combination of two or more kinds thereof.

The kind of the linear aliphatic dicarboxylic acid unit represented by the general formula (II-1) may be appropriately determined depending on the purposes. The linear aliphatic dicarboxylic acid unit in the polyamide resin (A) preferably contains at least one selected from the group consisting of an adipic acid unit, a sebacic acid unit and a 1,12-dodecanedicarboxylic acid unit, in an amount in total of 50% by mol or more based on the linear aliphatic dicarboxylic acid units, from the standpoint of imparting excellent gas barrier property to the polyamide resin (A), and maintaining the heat resistance of a packaging material and a packaging container after thermal sterilization, and the content thereof is more preferably 70% by mol or more, further preferably 80% by mol or more, and particularly preferably 90% by mol or more, and is preferably 100% by mol or less.

The linear aliphatic dicarboxylic acid unit in the polyamide resin (A) preferably contains an adipic acid unit in an amount of 50% by mol or more based on the linear aliphatic dicarboxylic acid units from the standpoint of the gas barrier property and the suitable thermal properties, such as the glass transition temperature and the melting point, of the polyamide resin (A). The linear aliphatic dicarboxylic acid unit in the polyamide resin (A) preferably contains a sebacic acid unit in an amount of 50% by mol or more based on the linear aliphatic dicarboxylic acid units from the standpoint of imparting suitable gas barrier property and molding suitability to the polyamide resin (A), and in the case where the polyamide resin (A) is applied to such a purpose that requires low water absorbing property, weather resistance and heat resistance, the linear aliphatic dicarboxylic acid unit preferably contains a 1,12-dodecanedicarboxylic acid unit in an amount of 50% by mol or more based on the linear aliphatic dicarboxylic acid units.

The aromatic dicarboxylic acid unit represented by the general formula (II-2) is preferred for imparting further gas barrier property to the polyamide resin (A), and for facilitating the molding processability of a packaging material and a packaging container.

In the general formula (II-2), Ar represents an arylene group. The arylene group is preferably an arylene group having from 6 to 30 carbon atoms, and more preferably an arylene group having from 6 to 15 carbon atoms, and examples thereof include a phenylene group and a naphthylene group.

Examples of the compound capable of constituting the aromatic dicarboxylic acid unit represented by the general formula (II-2) include terephthalic acid, isophthalic acid and 2,6-naphthalenedicarboxylic acid, but are not limited thereto. These compounds may be used solely or as a combination of two or more kinds thereof.

The kind of the aromatic dicarboxylic acid unit represented by the general formula (II-2) may be appropriately determined depending on the purposes. The aromatic dicarboxylic acid unit in the polyamide resin (A) preferably contains at least one selected from the group consisting of an isophthalic acid unit, a terephthalic acid unit and a 2,6-naphthalenedicarboxylic acid unit, in an amount in total of 50% by mol or more based on the aromatic dicarboxylic acid units, and the content thereof is more preferably 70% by mol or more, further preferably 80% by mol or more, and particularly preferably 90% by mol or more, and is preferably 100% by mol or less. Among these units, isophthalic acid and/or terephthalic acid are preferably contained in the aromatic dicarboxylic acid unit. The content ratio of the isophthalic acid unit and the terephthalic acid unit (isophthalic acid unit/terephthalic acid unit) is not particularly limited and may be determined depending on the purposes. For example, from the standpoint of providing a suitable glass transition temperature and decreasing the crystallinity, the molar ratio is preferably from 0/100 to 100/0, more preferably from 0/100 to 60/40, further preferably from 0/100 to 40/60, and still further preferably from 0/100 to 30/70, with the total of both the units being 100.

In the dicarboxylic acid unit in the polyamide resin (A), the content ratio of the linear aliphatic dicarboxylic acid unit and the aromatic dicarboxylic acid unit (linear aliphatic dicarboxylic acid unit/aromatic dicarboxylic acid unit) is not particularly limited and may be appropriately determined depending on the purposes. For example, in the case where the glass transition temperature of the polyamide resin (A) is to be increased, and the crystallinity of the polyamide resin (A) is to be decreased, the molar ratio (linear aliphatic dicarboxylic acid unit/aromatic dicarboxylic acid unit) is preferably from 0/100 to 60/40, more preferably from 0/100 to 40/60, and further preferably from 0/100 to 30/70, with the total of both the units being 100. In the case where the glass transition temperature of the polyamide resin (A) is to be decreased for imparting flexibility to the polyamide resin (A), the molar ratio (linear aliphatic dicarboxylic acid unit/ aromatic dicarboxylic acid unit) is preferably from 40/60 to 100/0, more preferably from 60/40 to 100/0, and further preferably from 70/30 to 100/0, with the total of both the units being 100.

Examples of the compound capable of constituting other dicarboxylic acid units than the dicarboxylic acid unit represented by the general formula (II-1) or (II-2) include dicarboxylic acids such as oxalic acid, malonic acid, fumaric acid, maleic acid, 1,3-benzenediacetic acid and 1,4-benzenediacetic acid, but are not limited thereto.

[Tertiary Hydrogen-Containing Carboxylic Acid Unit]

In the present invention, the tertiary hydrogen-containing carboxylic acid unit in the polyamide resin (A) has at least one each of an amino group and a carboxyl group, or has two or more of carboxyl groups, from the standpoint of the polymerization of the polyamide resin (A). Specific examples thereof include constitutional units represented by any one of the following general formulae (III), (IV) and (V):

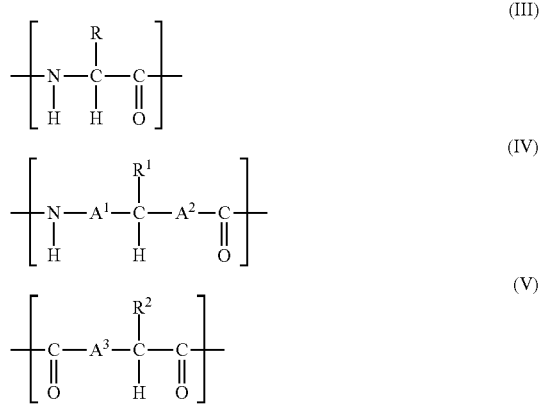

wherein, in the general formulae (III) to (V), R, $R^1$ and $R^2$ each represent a substituent, and $A^1$ to $A^3$ each represent a single bond or a divalent linking group, provided that the case where both $A^1$ and $A^2$ are single bonds in the general formula (IV) is excluded.

The polyamide resin (A) of the present invention contains the tertiary hydrogen-containing carboxylic acid unit. Owing to the tertiary hydrogen-containing carboxylic acid unit contained as a copolymerization component, the polyamide resin (A) exhibits an excellent oxygen absorbing capability without a transition metal contained.

The mechanism where the polyamide resin (A) containing the tertiary hydrogen-containing carboxylic acid unit exhibits a good oxygen absorbing capability in the present invention has not yet been clarified, but may be expected as follows. A compound capable of constituting the tertiary hydrogen-containing carboxylic acid unit has an electron withdrawing group and an electron donating group, both of which are bonded on the same carbon atom, and it is thus considered that a very stable radical is formed through a phenomenon referred to as the captodative effect where the unpaired electron present on the carbon atom is energetically stabilized. Specifically, the carboxyl group, which is an electron withdrawing group, makes electron deficient ($\delta^+$) the adjacent carbon having the tertiary hydrogen bonded thereto, and thus the tertiary hydrogen also becomes electron deficient ($\delta^+$), and is dissociated as a proton, thereby forming a radical. When oxygen and water are present therewith, it is considered that oxygen is reacted with the radical, and an oxygen absorbing capability is exhibited. It has been found that higher reactivity is obtained in an environment with a higher humidity and a higher temperature.

In the general formulae (III) to (V), R, $R^1$ and $R^2$ each represent a substituent. Examples of the substituent represented by R, $R^1$ and $R^2$ include a halogen atom (such as a chlorine atom, a bromine atom and an iodine atom), an alkyl group (such as a linear, branched or cyclic alkyl group having from 1 to 15 carbon atoms, and preferably from 1 to 6 carbon atoms, e.g., a methyl group, an ethyl group, a n-propyl group, an isopropyl group, a t-butyl group, a n-octyl group, a 2-ethylhexyl group, a cyclopropyl group and a cyclopentyl group), an alkenyl group (such as a linear, branched or cyclic alkenyl group having from 2 to 10 carbon atoms, and preferably from 2 to 6 carbon atoms, e.g., a vinyl group and an allyl group), an alkynyl group (such as an alkynyl group having from 2 to 10 carbon atoms, and preferably from 2 to 6 carbon atoms, e.g., an ethynyl group and a propargyl group), an aryl group (such as an aryl group having from 6 to 16 carbon atoms, and preferably from 6 to 10 carbon atoms, e.g., a phenyl group and a naphthyl group), a heterocyclic group (such as a monovalent group having from 1 to 12 carbon atoms, and preferably from 2 to 6 carbon atoms, which is obtained by removing one hydrogen atom from a 5-membered or 6-membered aromatic or nonaromatic heterocyclic compound, e.g., a 1-pyrazolyl group, a 1-imidazolyl group and a 2-furyl group), a cyano group, a hydroxyl group, a nitro group, an alkoxy group (such as a linear, branched or cyclic alkoxy group having from 1 to 10 carbon atoms, and preferably from 1 to 6 carbon atoms, e.g., a methoxy group and an ethoxy group), an aryloxy group (such as an aryloxy group having from 6 to 12 carbon atoms, and preferably from 6 to 8 carbon atoms, e.g., a phenoxy group), an acyl group (such as a formyl group, an alkylcarbonyl group having from 2 to 10 carbon atoms, and preferably from 2 to 6 carbon atoms, and an arylcarbonyl group having from 7 to 12 carbon atoms, and preferably from 7 to 9 carbon atoms, e.g., an acetyl group, a pivaloyl group and a benzoyl group), an amino group (such as an amino group, an alkylamino group having from 1 to 10 carbon atoms, and preferably from 1 to 6 carbon atoms, an anilino group having from 6 to 12 carbon atoms, and preferably from 6 to 8 carbon atoms, and a heterocyclic amino group having from 1 to 12 carbon atoms, and preferably from 2 to 6 carbon atoms, e.g., an amino group, a methylamino group and an anilino group), a mercapto group, an alkylthio group (such as an alkylthio group having from 1 to 10 carbon atoms, and preferably from 1 to 6 carbon atoms, e.g., a methylthio group and an ethylthio group), an arylthio group (such as an arylthio group having from 6 to 12 carbon atoms, and preferably from 6 to 8 carbon atoms, e.g., a phenylthio group), a heterocyclic thio group (such as a heterocyclic thio group having from 2 to 10 carbon atoms, and preferably from 2 to 6 carbon atoms, e.g., a 2-benzothiazolylthio group), and an imide group (such as an imide group having from 2 to 10 carbon atoms, and preferably from 4 to 8 carbon atoms, e.g., an N-succinimide group and an N-phthalimide group).

Among these functional groups, those having a hydrogen atom may be further substituted by the aforementioned groups, and examples thereof include an alkyl group substituted with a hydroxyl group (such as a hydroxyethyl group), an alkyl group substituted with an alkoxy group (such as a methoxyethyl group), an alkyl group substituted with an aryl group (such as a benzyl group), an aryl group substituted with an alkyl group (such as a p-tolyl group) and an aryloxy group substituted with an alkyl group (such as a 2-methylphenoxy group), but are not limited thereto.

In the case where the functional group is further substituted, the number of carbon atoms mentioned above does not contain the number of carbon atoms of the further substituent. For example, a benzyl group is considered as an alkyl group having one carbon atom substituted with a phenyl group, but is not considered as an alkyl group having 7 carbon atoms substituted with a phenyl group. The numbers of carbon atoms described hereinbelow are to be similarly understood unless otherwise indicated.

In the general formulae (IV) and (V), $A^1$ to $A^3$ each represent a single bond or a divalent linking group. In the general formula (IV), the case where both $A^1$ and $A^2$ are single bonds is excluded. Examples of the divalent linking group include a linear, branched or cyclic alkylene group (such as an alkylene group having from 1 to 12 carbon atoms, and preferably from 1 to 4 carbon atoms, e.g., a methylene group and an ethylene group), an aralkylene group (such as an aralkylene group having from 7 to 30 carbon atoms, and preferably from 7 to 13 carbon atoms, e.g., a benzylidene group) and an arylene group (such as an arylene group having from 6 to 30 carbon atoms, and preferably from 6 to 15 carbon atoms, e.g., a phenylene group). These groups may further have a substituent, and examples of the substituent include those exemplified as the functional groups for R, $R^1$ and $R^2$. Examples thereof include an arylene group substituted with an alkyl group (such as a xylylene group), but are not limited thereto.

The polyamide resin (A) of the present invention preferably contains at least one kind of the constitutional units represented by any one of the general formulae (III), (IV) and (V). Among these, a carboxylic acid unit having tertiary hydrogen on an α-carbon (a carbon atom that is adjacent to the carboxyl group) is preferred, and a constitutional unit represented by the general formula (III) is particularly preferred from the standpoint of the availability of the raw material and the enhancement of the oxygen absorbing capability.

The substituent R in the general formula (III) has been described above, and among them, a substituted or unsubstituted alkyl group and a substituted or unsubstituted aryl group are preferred, a substituted or unsubstituted alkyl group having from 1 to 6 carbon atoms and a substituted or unsubstituted aryl group having from 6 to 10 carbon atoms are more preferred, and a substituted or unsubstituted alkyl group having from 1 to 4 carbon atoms and a substituted or unsubstituted phenyl group are particularly preferred.

Preferred examples of R include a methyl group, an ethyl group, a n-propyl group, an isopropyl group, a n-butyl group, a t-butyl group, a 1-methylpropyl group, a 2-methylpropyl group, a hydroxymethyl group, a 1-hydroxyethyl group, a mercaptomethyl group, a methylsulfanylethyl group, a phenyl group, a naphthyl group, a benzyl group and a 4-hydroxybenzyl group, but are not limited thereto. Among these, a methyl group, an ethyl group, an isopropyl group, a 2-methylpropyl group and a benzyl group are more preferred.

Examples of the compound capable of constituting the constitutional unit represented by the general formula (III) include α-amino acids such as alanine, 2-aminobutyric acid, valine, norvaline, leucine, norleucine, tert-leucine, isoleucine, serine, threonine, cysteine, methionine, 2-phenylglycine, phenylalanine, tyrosine, histidine, tryptophan and proline, but are not limited thereto.

Examples of the compound capable of constituting the constitutional unit represented by the general formula (IV) include β-amino acids such as 3-aminobutyric acid, and examples of the compound capable of constituting the constitutional unit represented by the general formula (V) include dicarboxylic acids such as methylmalonic acid, methylsuccinic acid, malic acid and tartaric acid, but are not limited thereto.

These compounds may be a D-isomer, an L-isomer or a racemic substance, and may also be an allo-isomer. These compounds may be used solely or as a combination of two or more kinds thereof.

Among these, an α-amino acid having tertiary hydrogen on an α-carbon is particularly preferred from the standpoint of the availability of the raw material, the enhancement of the oxygen absorbing capability and the like. In the α-amino acid, alanine is most preferred from the standpoint of the availability, the low cost, the easiness of polymerization, and the low yellowness index (YI) of the polymer. Alanine has a relatively low molecular weight and thus exhibits a high polymerization ratio per 1 g of the polyamide resin (A), and therefore, alanine provides a good oxygen absorbing capability per 1 g of the polyamide resin (A).

The purity of the compound capable of constituting the tertiary hydrogen-containing carboxylic acid unit is preferably 95% or more, more preferably 98.5% or more, and further preferably 99% or more, from the standpoint of the influence on polymerization such as delay of the polymerization rate, and the influence on the product quality such as the yellowness index of the polymer. The amount of a sulfate ion and an ammonium ion contained as impurities is preferably 500 ppm or less, more preferably 200 ppm or less, and further preferably 50 ppm or less.

[ω-Aminocarboxylic Acid Unit]

The polyamide resin (A) of the present invention may further contain an ω-aminocarboxylic acid unit represented by the following general formula (X), in addition to the diamine unit, the dicarboxylic acid unit and the tertiary hydrogen-containing carboxylic acid unit, in the case where the polyamide resin (A) requires flexibility or the like.

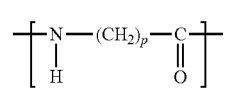

(X)

wherein, in the general formula (X), p represents an integer of from 2 to 18.

The content of the ω-aminocarboxylic acid unit is preferably from 0.1 to 49.9% by mol, more preferably from 3 to 40% by mol, and further preferably from 5 to 35% by mol, based on the total constitutional units of the polyamide resin (A). The total content of the diamine unit, the dicarboxylic acid unit, the tertiary hydrogen-containing carboxylic acid unit and the ω-aminocarboxylic acid unit does not exceed 100% by mol.

In the general formula (X), p represents an integer of from 2 to 18, preferably from 3 to 16, more preferably from 4 to 14, and further preferably from 5 to 12.

Examples of the compound capable of constituting the ω-aminocarboxylic acid unit represented by the following general formula (X) include an ω-aminocarboxylic acid having from 5 to 19 carbon atoms and a lactam having from 5 to 19 carbon atoms. Examples of the ω-aminocarboxylic acid having from 5 to 19 carbon atoms include 6-aminohexanoic acid and 12-aminododecanoic acid, and examples of the lactam having from 5 to 19 carbon atoms include ε-caprolactam and laurolactam, but are not limited thereto. These compounds may be used solely or as a combination of two or more kinds thereof.

The ω-aminocarboxylic acid unit preferably contains a 6-aminohexanoic acid unit and/or a 12-aminododecanoic acid unit in an amount in total of 50% by mol or more based on the ω-aminocarboxylic acid units, and the content thereof is more preferably 70% by mol or more, more preferably 80% by mol or more, and further preferably 90% by mol or more, and is preferably 100% by mol or less.

[Polymerization Degree of Polyamide Resin (A)]

With respect to the polymerization degree of the polyamide resin (A), a relative viscosity is used. The relative viscosity of the polyamide resin (A) is preferably from 1.8 to 4.2, more preferably from 1.9 to 4.0, and further preferably from 2.0 to 3.8, from the standpoint of the strength and appearance of the molded article and the molding processability.

The relative viscosity referred herein is a ratio of the fall time (t) of the polyamide resin (A) measured by dissolving 1 g of the polyamide resin (A) in 100 mL of 96% sulfuric acid and measuring the resulting solution with a Cannon-Fenske viscometer at 25° C., and the fall time ($t_0$) of 96% sulfuric acid measured in the same manner, and shown by the following expression.

Relative viscosity=$t/t_0$

[Terminal Amino Group Concentration]

The oxygen absorption rate of the polyamide resin (A) and the oxidative degradation of the polyamide resin (A) due to oxygen absorption may be controlled by changing the terminal amino group concentration of the polyamide resin (A). In the present invention, the terminal amino group concentration of the polyamide resin (A) is preferably in a range of from 5 to 150 μeq/g, more preferably from 10 to 100 μeq/g, and further preferably from 15 to 80 μeq/g, from the standpoint of the balance between the oxygen absorption rate and the oxidative degradation.

<Production Method of Polyamide Resin (A)>

The polyamide resin (A) may be produced by polycondensation of a diamine component capable of constituting the diamine unit, a dicarboxylic acid component capable of constituting the dicarboxylic acid unit, a tertiary hydrogen-containing carboxylic acid component capable of constituting the tertiary hydrogen-containing carboxylic acid unit, and depending on necessity, an ω-aminocarboxylic acid component capable of constituting the ω-aminocarboxylic acid unit. The polymerization degree thereof may be controlled by adjusting the polycondensation conditions and the like. As a molecular weight controlling agent, a small amount of a monoamine and a monocarboxylic acid may be added upon polycondensation. Furthermore, for providing an intended polymerization degree by suppressing the polycondensation reaction, the ratio (molar ratio) of the diamine component and the carboxylic acid component constituting the polyamide resin (A) may be deviated from 1.

Examples of the polycondensation method of the polyamide resin (A) include a reactive extrusion method, a pressurized salt method, an atmospheric dropping method and a pressurized dropping method, but are not limited thereto. The reaction temperature is preferably as low as possible, and thereby the polyamide resin (A) may be prevented from suffering yellowing or gelation, and the polyamide resin (A) having stable properties may be obtained.

[Reactive Extrusion Method]

In the reactive extrusion method, a polyamide prepared from the diamine component and the dicarboxylic acid component (i.e., a polyamide corresponding to a precursor of the polyamide resin (A)) or a polyamide prepared from the diamine component, the dicarboxylic acid component and the ω-aminocarboxylic acid component (i.e., a polyamide corresponding to a precursor of the polyamide resin (A)) is reacted with the tertiary hydrogen-containing carboxylic acid component by melt-kneading in an extruder. In this method, the tertiary hydrogen-containing carboxylic acid component is incorporated into the skeleton of the polyamide through amide exchange reaction, and for performing the reaction sufficiently, it is preferred to use a screw suitable for the reactive extrusion and a twin screw extruder having a large L/D ratio. This method is convenient and suitable for producing the polyamide resin (A) that contains a small amount of the tertiary hydrogen-containing carboxylic acid unit.

[Pressurized Salt Method]

In the pressurized salt method, a nylon salt as a raw material is subjected to melt polycondensation under increased pressure. Specifically, a nylon salt aqueous solution containing the diamine component, the dicarboxylic acid component, the tertiary hydrogen-containing carboxylic acid component, and depending on necessity the ω-aminocarboxylic acid component is prepared, and then the aqueous solution is concentrated and then subjected to polycondensation by increasing the temperature thereof under increased pressure while removing condensation water. While returning the inside of the reaction vessel gradually to the atmospheric pressure, the temperature is increased to a temperature higher by approximately 10° C. than the melting point of the polyamide resin (A) and maintained, and then while the pressure is decreased gradually to −0.02 MPaG, the temperature is maintained for continuously performing the polycondensation. After reaching the agitation torque to a constant value, the inside of the reaction vessel is pressurized with nitrogen to approximately 0.3 MPaG, thereby recovering the polyamide resin (A).

The pressurized salt method is useful in the case where a volatile component is used as a monomer, and is a preferred polycondensation method in the case where the copolymerization ratio of the tertiary hydrogen-containing carboxylic acid component is large. The method is particularly preferred for producing the polyamide resin (A) containing the tertiary hydrogen-containing carboxylic acid unit in an amount of 15% by mol or more based on the total constitutional units of the polyamide resin (A). The use of the pressurized salt method prevents the tertiary hydrogen-containing carboxylic acid component from evaporating, and furthermore prevents the tertiary hydrogen-containing carboxylic acid component from undergoing polycondensation solely, and thus the polycondensation reaction can be smoothly performed, thereby providing the polyamide resin (A) having excellent properties.

[Atmospheric Dropping Method]

In the atmospheric dropping method, the diamine component is continuously added dropwise to a mixture obtained by melting under heat the dicarboxylic acid component, the tertiary hydrogen-containing carboxylic acid component, and depending on necessity, the ω-aminocarboxylic acid component, thereby performing the polycondensation while removing condensation water. The polycondensation reaction is performed under heating the reaction system, thereby preventing the reaction temperature from becoming lower than the melting point of the polyamide resin (A) produced.

As compared to the pressurized salt method, the atmospheric dropping method provides a larger yield per batch because no water for dissolving the salt is used, and undergoes less decrease in reaction rate because vaporization and condensation of the raw material components, thereby shortening the process time.

[Pressurized Dropping Method]

In the pressurized dropping method, the dicarboxylic acid component, the tertiary hydrogen-containing carboxylic acid component, and depending on necessity, the ω-aminocarboxylic acid component are charged in a polycondensation vessel, and the components are melt-mixed by agitation to prepare a mixture. Subsequently, while pressurizing the inside of the vessel to approximately from 0.3 to 0.4 MPaG, the diamine component is continuously added dropwise to the mixture, thereby performing the polycondensation while removing condensation water. At this time, the polycondensation reaction is performed under heating the reaction system, thereby preventing the reaction temperature from becoming lower than the melting point of the polyamide resin (A) produced. After reaching the prescribed molar ratio, the dropwise addition of the diamine component is terminated. Then, while returning the inside of the vessel gradually to the atmospheric pressure, the temperature is increased to a temperature higher by approximately 10° C. than the melting point of the polyamide resin (A) and maintained, and then while the pressure is decreased gradually to −0.02 MPaG, the temperature is maintained for continuously performing the polycondensation. After reaching the agitation torque to a constant value, the inside of the vessel is pressurized with nitrogen to approximately 0.3 MPaG, thereby recovering the polyamide resin (A).

As similar to the pressurized salt method, the pressurized dropping method is useful in the case where a volatile component is used as a monomer, and is a preferred polycondensation method in the case where the copolymerization ratio of the tertiary hydrogen-containing carboxylic acid component is large. The method is particularly preferred for producing the polyamide resin (A) containing the tertiary hydrogen-containing carboxylic acid unit in an amount of 15% by mol or more based on the total constitutional units of the polyamide resin (A). The use of the pressurized dropping method prevents the tertiary hydrogen-containing carboxylic acid component from evaporating, and furthermore prevents the tertiary hydrogen-containing carboxylic acid component from undergoing polycondensation solely, and thus the polycondensation reaction can be smoothly performed, thereby providing the polyamide resin (A) having excellent properties. Moreover, as compared to the pressurized salt method, the pressurized dropping method provides a larger yield per batch because no water for dissolving the salt is used, and can shorten the reaction time as similar to the atmospheric dropping method, thereby providing the polyamide resin (A) with a low yellowness index through prevention of gelation or the like.

[Step of Increasing Polymerization Degree]

The polyamide resin (A) thus produced by the aforementioned polycondensation methods may be used as it is, or may further be subjected to a step of further increasing the polymerization degree. Examples of the step of further increasing the polymerization degree include reactive extrusion in an extruder and solid phase polymerization. Preferred examples of a heating device used for solid phase polymerization include a continuous heating and drying device, a rotation drum heating device which is referred to as a tumble dryer, a conical dryer and a rotary dryer, and a conical heating device having a rotary blade inside the device which is referred to as a Nauta mixer, but are not limited thereto, and known methods and devices may be used. Particularly, in the case where the polyamide resin (A) is subjected to solid phase polymerization, the rotation drum heating device is preferred among the above devices since the system can be sealed, and thereby the polycondensation can be performed in a state where oxygen causing coloration is removed.

[Phosphorus Atom-Containing Compound and Alkali Metal Compound]

In the polycondensation of the polyamide resin (A), a phosphorus atom-containing compound is preferably added from the standpoint of acceleration of the amidation reaction.

Examples of the phosphorus atom-containing compound include a phosphinic acid compound, such as dimethylphosphinic acid and phenylmethylphosphinic acid; a hypophosphorous acid compound, such as hypophosphorous acid, sodium hypophosphite, potassium hypophosphite, lithium hypophosphite, magnesium hypophosphite, calcium hypophosphite and ethyl hypophosphite; a phosphonic acid compound, such as phosphonic acid, sodium phosphonate, potassium phosphonate, lithium phosphonate, magnesium phosphonate, calcium phosphonate, phenylphosphonic acid, ethylphosphonic acid, sodium phenylphosphonate, potassium phenylphosphonate, lithium phenylphosphonate, diethyl phenylphosphonate, sodium ethylphosphonate and potassium ethylphosphonate; a phosphonous acid compound, such as phosphonous acid, sodium phosphonite, lithium phosphonite, potassium phosphonite, magnesium phosphonite, calcium phosphonite, phenylphosphonous acid, sodium phenylphosphonite, potassium phenylphosphonite, lithium phenylphosphonite and ethyl phenylphosphonite; and a phosphorous acid compound, such as phosphorous acid, sodium hydrogen phosphite, sodium phosphite, lithium phosphite, potassium phosphite, magnesium phosphite, calcium phosphite, triethyl phosphite, triphenyl phosphite and pyrophosphorous acid.

Among these, a metal salt of hypophosphorous acid, such as sodium hypophosphite, potassium hypophosphite and lithium hypophosphite, is preferably used since it greatly accelerates the amidation reaction and is excellent in prevention of coloration, and sodium hypophosphite is particularly preferred. The phosphorus atom-containing compound that can be used in the present invention is not limited to these compounds.

The amount of the phosphorus atom-containing compound added is preferably from 0.1 to 1,000 ppm, more preferably from 1 to 600 ppm, and further preferably from 5 to 400 ppm, in terms of phosphorus atom concentration in the polyamide resin (A). When the amount thereof is 0.1 ppm or more, the polyamide resin (A) is hard to be colored during the polymerization, thereby providing high transparency. When the amount thereof is 1,000 ppm or less, the polyamide resin (A) is hard to be gelled, and fish eyes, which are considered to be caused by the phosphorus atom-containing compound, can be suppressed from being contained in a molded article, thereby providing a molded article with a good appearance.

In the polycondensation system of the polyamide resin (A), an alkali metal compound is preferably added in combination with the phosphorus atom-containing compound. For preventing the polyamide resin (A) from being colored during the polycondensation, the phosphorus atom-containing compound is necessarily present in a sufficient amount, but it may cause gelation of the polyamide resin (A) in some cases, and therefore, an alkali metal compound is preferably used in combination therewith for controlling the amidation reaction rate.

Preferred examples of the alkali metal compound include an alkali metal hydroxide, an alkali metal acetate salt, an alkali metal carbonate salt and an alkali metal alkoxide. Specific examples of the alkali metal compound capable of being used in the present invention include lithium hydroxide, sodium hydroxide, potassium hydroxide, rubidium hydroxide, cesium hydroxide, lithium acetate, sodium acetate, potassium acetate, rubidium acetate, cesium acetate, sodium methoxide, sodium ethoxide, sodium propoxide, sodium butoxide, potassium methoxide, lithium methoxide and sodium carbonate. The alkali metal compound may be used without limitation to these compounds. The ratio (molar ratio) of the phosphorus atom-containing compound and the alkali metal compound, phosphorus atom-containing compound/alkali metal compound, is preferably from 1.0/0.05 to 1.0/1.5, more preferably from 1.0/0.1 to 1.0/1.2, and further preferably from 1.0/0.2 to 1.0/1.1, from the standpoint of controlling the polymerization rate and lowering the yellowness index.

1-2. Additive (C)

The oxygen absorbing barrier layer of the present invention may contain, in addition to the polyamide resin (A), an additive (C) depending on necessity. The additive (C) may be only one kind or a combination of two or more kinds thereof. The content of the additive (C) in the oxygen absorbing barrier layer is preferably 10% by mass or less, and more preferably 5% by mass or less, while it depends on the kind of the additive.

[Whitening Preventing Agent and Interlayer Delamination Preventing Agent]

In the present invention, at least one selected from the group consisting of a fatty acid metal salt, a diamide compound and a diester compound is preferably added as a whitening preventing agent or an interlayer delamination preventing agent to the polyamide resin (A) for preventing whitening after subjecting to a hydrothermal treatment or after elapse of a prolonged period of time and for preventing delamination among the different resin layers upon dropping or application of impact. The compounds are expected to exhibit both the whitening prevention and interlayer delamination prevention. Examples of the compound having the interlayer delamination preventing function include a reducible organic compound. As described later, the fatty acid metal salt also has a function of an oxidation reaction accelerator, and the reducible organic compound also has a function of an oxygen absorbent.

The number of carbon atoms of the fatty acid metal salt is preferably from 18 to 50, and more preferably from 18 to 34. The fatty acid constituting the fatty acid metal salt may have a side chain and a double bond, but a linear saturated fatty acid, such as stearic acid (C18), eicosanoic acid (C20), behenic acid (C22), montanic acid (C28) and triacontanoic acid (C30), is preferred. The metal that forms the salt with the fatty acid is not particularly limited, examples of which include sodium, potassium, lithium, calcium, barium, magnesium, strontium, aluminum and zinc, and sodium, potassium, lithium, calcium, aluminum and zinc are particularly preferred.

Preferred examples of the diamide compound used in the present invention include a diamide compound obtained with an aliphatic dicarboxylic acid having from 8 to 30 carbon atoms and a diamine having from 2 to 10 carbon atoms. The whitening prevention effect is expected with an aliphatic dicarboxylic acid having 8 or more carbon atoms and a diamine having 2 or more carbon atoms. The diamide compound may be favorably dispersed uniformly in the oxygen absorbing barrier layer with an aliphatic dicarboxylic acid having 30 or less carbon atoms and a diamine having 10 or less carbon atoms. The aliphatic dicarboxylic acid may have a side chain and a double bond, but a linear saturated aliphatic dicarboxylic acid is preferred. The diamide compound may be used solely with one kind or as a combination of two or more kinds thereof.

Examples of the aliphatic dicarboxylic acid include stearic acid (C18), eicosanoic acid (C20), behenic acid (C22), montanic acid (C28) and triacontanoic acid (C30). Examples of the diamine include ethylenediamine, butylenediamine, hexanediamine, xylylenediamine and bis(aminomethyl)cyclohexane. The diamide compound that is obtained by combining these compounds is preferred.

A diamide compound obtained with an aliphatic dicarboxylic acid having from 8 to 30 carbon atoms and a diamine mainly containing ethylene diamine, and a diamine compound obtained with an aliphatic dicarboxylic acid mainly containing montanic acid and a diamine having from 2 to 10 carbon atoms are preferred, and a diamine compound obtained with an aliphatic dicarboxylic acid mainly containing stearic acid and a diamine mainly containing ethylenediamine is particularly preferred.

Preferred examples of the diester compound used in the present invention include a diester compound obtained with an aliphatic dicarboxylic acid having from 8 to 30 carbon atoms and a diol having from 2 to 10 carbon atoms. The whitening prevention effect is expected with an aliphatic dicarboxylic acid having 8 or more carbon atoms and a diol having 2 or more carbon atoms. The diester compound may be favorably dispersed uniformly in the oxygen absorbing barrier layer with an aliphatic dicarboxylic acid having 30 or less carbon atoms and a diol having 10 or less carbon atoms. The aliphatic dicarboxylic acid may have a side chain and a double bond, but a linear saturated aliphatic dicarboxylic acid is preferred. The diester compound may be used solely with one kind or as a combination of two or more kinds thereof.

Examples of the aliphatic dicarboxylic acid include stearic acid (C18), eicosanoic acid (C20), behenic acid (C22), montanic acid (C28) and triacontanoic acid (C30). Examples of the diol include ethylene glycol, propanediol, butanediol, hexanediol, xylylene glycol and cyclohexanedimethanol. The diester compound that is obtained by combining these compounds is preferred.

A diester compound obtained with an aliphatic dicarboxylic acid mainly containing montanic acid and a diol mainly containing ethylene glycol and/or 1,3-butanediol is particularly preferred.

In the present invention, the total amount of the fatty acid metal salt, the diamide compound and the diester compound added may be from 0.005 to 0.5% by mass, preferably from 0.05 to 0.5% by mass, and particularly preferably from 0.12 to 0.5% by mass, in the oxygen absorbing barrier layer. When these compounds are added in an amount of 0.005% by mass or more in the oxygen absorbing barrier layer, and a crystallization nucleating agent is used in combination, a synergistic effect of whitening prevention may be expected. When the amount is 0.5% by mass or less in the oxygen absorbing barrier layer, a molded article obtained by molding the polyamide resin (A) of the present invention may have a clouding point maintained at a low level.

As the reducible organic compound, a photo reducible pigment, such as a quinone compound and an azo compound, and a carbonyl compound having absorption in an UV spectrum may be preferably used. Among these, a quinone compound is particularly preferred. A quinone compound has two carbonyl groups (for example, ketone structures) present on a ring such as a benzene ring, examples of which include a quinone such as benzoquinone, anthraquinone and naphthoquinone, and a derivative of a quinone having added thereto a functional group such as a hydroxyl group, a methyl group, an ethyl group, an amino group and a carboxyl group, and hydrogen may be partially added to the quinones and the derivatives thereof (hereinafter referred to as a benzoquinone compound, an anthraquinone compound and a naphthoquinone compound, respectively). The kind, number and position of the functional group are not particularly limited. The benzoquinone compound, the anthraquinone compound and the naphthoquinone compound may be a dimer, a trimer or the like.

Examples of the benzoquinone compound include 1,2-benzoquinone (o-benzoquinone), 1,4-benzoquinone (p-benzoquinone), 2-chloro-1,4-benzoquinone, 2,3-dichloro-5,6-dicyanobenzoquinone, 2,5-dichloro-3,6-dihydroxy-1,4-benzoquinone, 2,5-di chloro-1,4-benzoquinone, 2,6-dichloro-1,4-benzoquinone, 2,5-dihydroxy-1,4-benzoquinone, 2,6-di-tert-butyl-1,4-benzoquinone, 3,5-di-tert-butyl-1,2-benzoquinone, 2,6-dibromo-N-chloro-1,4-benzoquinoneimine, 2,6-dibromo-N-chloro-1,4-benzoquinonemonoimine, 2,5-dimethyl-1,4-benzoquinone, 2,6-dimethylbenzoquinone, 2,6-dimethoxy-1,4-benzoquinone, tetrachloro-1,4-benzoquinone, tetrachloro-1,2-benzoquinone, tetrahydroxy-1,4-benzoquinone, tetrafluoro-1,4-benzoquinone, N,2,6-trichloro-1,4-benzoquinonemonoimine, trimethyl-1,4-benzoquinone, phenyl-1,4-benzoquinone, 1,4-benzoquinone dioxime and methyl-1,4-benzoquinone, and the benzoquinone compound is not limited to these compounds.

Examples of the anthraquinone compound include anthraquinone, 2-methylanthraquinone, 2-ethylanthraquinone, dihydroxyanthraquinone, trihydroxyanthraquinone, 1,2,3,4-tetrahydroanthraquinone, 1,4,4a,9a-tetrahydroanthraquinone, hexahydroanthraquinone, 1-aminoanthraquinone, 1-amino-4-hydroxyanthraquinone, disodium anthraquinone-2,6-disulfonate, sodium anthraquinone-1-sulfonate, sodium anthraquinone-2-sulfonate monohydrate, 1-chloroanthraquinone, 2-chloroanthraquinone, 1,4-diaminoanthraquinone, 1,5-dichloroanthraquinone, 1,5-dihydroxyanthraquinone, 1,8-dihydroxyanthraquinone, 1,4-dihydroxyanthraquinone, 4,5-dihydroxyanthraquinone-2-carboxylic acid, 1,4-dimethylanthraquinone, 1,2,4-trihydroxyanthraquinone, 2-(hydroxymethyl)anthraquinone and 2-tert-butylanthraquinone, and the anthraquinone compound is not limited to these compounds.

Examples of the naphthoquinone compound include 1,2-naphthoquinone, 1,4-naphthoquinone, 2-hydroxy-1,4-naphthoquinone, 5-hydroxy-1,4-naphthoquinone, 5,8-dihydroxy-1,4-naphthoquinone, 2-methyl-1,4-naphthoquinone, 2,3-dichloro-5,8-dihydroxy-1,4-naphthoquinone, 2,3-dichloro-1,4-naphthoquinone and sodium 1,2-naphthoquinone-4-sulfonate, and the naphthoquinone compound is not limited to these compounds.

The reducible organic compound is preferably selected from the benzoquinone compound, the anthraquinone compound and the naphthoquinone compound. The reducible organic compound is more preferably selected from the benzoquinone compound, the anthraquinone compound and the naphthoquinone compound that are partially hydrogenated. The reducible organic compound is further preferably selected from the benzoquinone compound, the anthraquinone compound and the naphthoquinone compound that have a functional group and are partially hydrogenated. The reducible organic compound is particularly preferably selected from tetrahydroanthraquinone, tetrahydroanthraquinone having a functional group, hexahydroanthraquinone, and hexahydroanthraquinone having a functional group.

The content of the reducible organic compound is preferably from 1 to 10% by mass contained in the oxygen absorbing barrier layer, and when the content is in the range, a molded article having good interlayer delamination resistance may be obtained.

[Layered Silicate]

In the present invention, the oxygen absorbing barrier layer may contain a layered silicate. The addition of the layered silicate can impart not only the oxygen barrier property, but also the barrier property to other gases, such as carbon dioxide gas, to the multilayer injection molded article.

The layered silicate is a di-octahedral or tri-octahedral layered silicate having a charge density of from 0.25 to 0.6, examples of the di-octahedral one include montmorillonite and beidellite, and examples of the tri-octahedral one include hectorite and saponite. Among these, montmorillonite is preferred.

The layered silicate is preferably made in contact with an organic swelling agent, such as a polymer compound and an organic compound, in advance, thereby expanding the layers of the layered silicate. Preferred examples of the organic swelling agent include a tertiary ammonium salt, and a tertiary ammonium salt having at least one alkyl or alkenyl group having 12 or more carbon atoms is preferably used.

Specific examples of the organic swelling agent include a trimethyl alkyl ammonium salt, such as a trimethyl dodecyl ammonium salt, a trimethyl tetradecyl ammonium salt, a trimethyl hexadecyl ammonium salt, a trimethyl octadecyl ammonium salt and a trimethyl eicosyl ammonium salt; a trimethyl alkenyl ammonium salt, such as a trimethyl octadecenyl ammonium salt and a trimethyl octadecadienyl ammonium salt; a triethyl alkyl ammonium salt, such as a triethyl dodecyl ammonium salt, a triethyl tetradecyl ammonium salt, a triethyl hexadecyl ammonium salt and a triethyl octadecyl ammonium salt; a tributyl alkyl ammonium salt, such as a tributyl dodecyl ammonium salt, a tributyl tetradecyl ammonium salt, a tributyl hexadecyl ammonium salt and a tributyl octadecyl ammonium salt; a dimethyl dialkyl ammonium salt, such as a dimethyl didodecyl ammonium salt, a dimethyl ditetradecyl ammonium salt, a dimethyl dihexadecyl ammonium salt, a dimethyl dioctadecyl ammonium salt and a dimethyl ditallow ammonium salt; a dimethyl dialkenyl ammonium salt, such as a dimethyl dioctadecenyl ammonium salt and a dimethyl dioctadecadienyl ammonium salt; a diethyl dialkyl ammonium salt, such as a diethyl didodecyl ammonium salt, a diethyl ditetradecyl ammonium salt, a diethyl dihexadecyl ammonium salt and a diethyl dioctadecyl ammonium salt; a dibutyl dialkyl ammonium salt, such as a dibutyl didodecyl ammonium salt, a dibutyl ditetradecyl ammonium salt, a dibutyl dihexadecyl ammonium salt and a dibutyl dioctadecyl ammonium salt; a methyl benzyl dialkyl ammonium salt, such as a methyl benzyl dihexadecyl ammonium salt; a dibenzyl dialkyl ammonium salt, such as dibenzyl dihexadecyl ammonium salt; a trialkyl methyl ammonium salt, such as a tridecyl methyl ammonium salt, a tritetradecyl methyl ammonium salt and a trioctadecyl methyl ammonium salt; a trialkyl ethyl ammonium salt, such as a tridodecyl ethyl ammonium salt; a trialkyl butyl ammonium salt, such as a tridodecyl butyl ammonium salt; and an ω-amino acid, such as 4-amino-n-butyric acid, 6-amino-n-caproic acid, 8-aminocaprylic acid, 10-aminodecanoic acid, 12-aminododecanoic acid, 14-aminotetradecanoic acid, 16-aminohexadecanoic acid and 18-aminooctadecanoic acid. An ammonium salt containing a hydroxyl group and/or an ether group may also be used as the organic swelling agent, and particularly a tertiary ammonium salt containing at least one alkylene glycol residual group, such as a methyl dialkyl (PAG) ammonium salt, an ethyl dialkyl (PAG) ammonium salt, a butyl dialkyl (PAG) ammonium salt, a dimethyl bis(PAG) ammonium salt, a diethyl bis(PAG) ammonium salt, a dibutyl bis(PAG) ammonium salt, a methyl alkyl bis(PAG) ammonium salt, an ethyl alkyl bis(PAG) ammonium salt, a butyl alkyl bis(PAG) ammonium salt, a methyl tri(PAG) ammonium salt, an ethyl tri(PAG) ammonium salt, a butyl tri(PAG) ammonium salt and a tetra(PAG) ammonium salt (wherein the alkyl means an alkyl group having 12 or more carbon atoms, such as dodecyl, tetradecyl, hexadecyl, octadecyl and eicosyl, and PAG means a polyalkylene glycol residual group, and preferably a polyethylene glycol residual group or a polypropylene glycol residual group each having 20 or less carbon atoms), may also be used as the organic swelling agent. Among these, a trimethyl dodecyl ammonium salt, a trimethyl tetradecyl ammonium salt, a trimethyl hexadecyl ammonium salt, a trimethyl octadecyl ammonium salt, a dimethyl didodecyl ammonium salt, a dimethyl ditetradecyl ammonium salt, a dimethyl dihexadecyl ammonium salt, a dimethyl dioctadecyl ammonium salt and a dimethyl ditallow ammonium salt are preferred. The organic swelling agent may be used solely or as a mixture of plural kinds thereof.

In the present invention, the oxygen absorbing barrier layer containing from 0.5 to 8% by mass of the layered silicate having been treated with the organic swelling agent is preferably used, and the amount of the layered silicate is more preferably from 1 to 6% by mass, and more preferably from 2 to 5% by mass. When the amount of the layered silicate added is 0.5% by mass or more, the improvement in gas barrier property may be sufficiently obtained. When the amount thereof is 8% by mass or less, the gas barrier layer may be prevented from suffering a problem of formation of pinholes due to deterioration of flexibility of the oxygen absorbing barrier layer.

In the oxygen absorbing barrier layer, the layered silicate is preferably dispersed uniformly without local aggregation. The uniform dispersion referred herein means that the layered silicate is separated into flat plates in the oxygen absorbing barrier layer, and 50% or more of the flat plates have an interlayer distance of 5 nm or more. The interlayer distance referred herein means the distance between barycenters of the flat plates. When the distance is larger, a better dispersed state is obtained, which results in improvement of the appearance, such as the transparency, and enhancement of the gas barrier property to oxygen, carbon dioxide and the like.

[Oxidation Reaction Accelerator]

For further enhancing the oxygen absorbing capability of the oxygen absorbing barrier layer, a known oxidation reaction accelerator may be added in such a range that does not impair the advantages of the present invention. The oxidation reaction accelerator can facilitate the oxygen absorbing capability of the polyamide resin (A), thereby enhancing the oxygen absorbing capability of the oxygen absorbing barrier layer. Examples of the oxidation reaction accelerator include an inorganic or organic salt of a metal of Group VIII in the periodic table, such as iron, cobalt and nickel, a metal of Group I, such as copper and silver, a metal of Group IV, such as tin, titanium and zirconium, and a metal with a low valency of Group V, such as vanadium, Group VI, such as chromium, or Group VII, such as manganese, and complex salts of the transition metals. Among these, a cobalt salt and a combination of a cobalt salt and a manganese salt are preferred owing to the excellent oxidation reaction accelerating effect thereof.

In the present invention, the amount of the oxidation reaction accelerator added is preferably from 10 to 800 ppm, more preferably from 50 to 600 ppm, and further preferably from 100 to 400 ppm, in terms of metal atom concentration in the oxygen absorbing barrier layer. The effect of oxidation reaction acceleration depends on the terminal amino group concentration $[NH_2]$ of the polyamide resin (A), and the oxidation reaction is accelerated when the terminal amino group concentration $[NH_2]$ is lower.

[Oxygen Absorbent]

For further enhancing the oxygen absorbing capability of the oxygen absorbing barrier layer, a known oxygen absorbent may be added in such a range that does not impair the advantages of the present invention. The oxygen absorbent imparts an oxygen absorbing capability to the oxygen absorbing barrier layer separately from the oxygen absorbing capability of the polyamide resin (A), thereby enhancing the oxygen absorbing capability of the oxygen absorbing barrier layer. Examples of the oxygen absorbent include oxidizing organic compounds, such as a compound having a carbon-carbon double bond in the molecule, for example, vitamin C, vitamin E, butadiene and isoprene.

In the present invention, the amount of the oxygen absorbent added is preferably from 0.01 to 5% by mass, more preferably from 0.1 to 4% by mass, and further preferably from 0.5 to 3% by mass, in the oxygen absorbing barrier layer.

[Gelation Preventing and Fish Eye Preventing Agent]

In the present invention, an addition of at least one kind of a carboxylate salt compound selected from sodium acetate, calcium acetate, magnesium acetate, calcium stearate, magnesium stearate, sodium stearate, and derivatives thereof is preferred. Examples of the derivatives herein include a metal 12-hydroxystearate salt, such as calcium 12-hydroxystearate, magnesium 12-hydroxystearate and sodium 12-hydroxystearate. The addition of the carboxylate salt compound prevents gelation of the polyamide resin (A), which occur during the molding process, and suppresses fish eyes in a molded article thereby enhancing the molding processability.

The amount of the carboxylate salt compound added is preferably from 400 to 10,000 ppm, more preferably from 800 to 5,000 ppm, and further preferably from 1,000 to 3,000 ppm, in terms of concentration in the oxygen absorbing barrier layer. When the amount thereof is 400 ppm or more, the polyamide resin (A) is suppressed from suffering thermal degradation, thereby preventing gelation. When the amount is 10,000 ppm or less, the polyamide resin (A) may not cause molding failure and may not suffer coloration or whitening. When the carboxylate salt compound, which is a basic substance, is present in the molten polyamide resin (A), it is expected that the degradation of the polyamide resin (A) caused by heat is delayed, and thereby formation of gel, which is a final denaturation product, is suppressed.

The carboxylate salt compounds mentioned above are excellent in handleability, and among these, a metal stearate salt is preferred since it is inexpensive, has a function of a lubricant, and stabilizes the molding process. The form of the carboxylate salt compound is not particularly limited. The compound in the form of powder with a smaller particle diameter is preferred for dry mixing since it can be uniformly dispersed in the oxygen absorbing barrier layer, and the particle diameter thereof is preferably 0.2 mm or less.

Furthermore, for further effective gelation prevention and fish eye prevention and for prevention of burning, sodium acetate, which has a high metal salt concentration per 1 g, is preferably used. In the case where sodium acetate is used, it may be dry-mixed with the polyamide resin (A) and then molded, or from the standpoint of handleability, prevention of acetic acid odor and the like, a master batch containing the polyamide resin (A) and sodium acetate is preferably dry-mixed with the polyamide resin (A) and then molded. Sodium acetate used in the master batch preferably has a particle diameter of 0.2 mm or less, and more preferably 0.1 mm or less, for facilitating uniform dispersion thereof in the polyamide resin (A).

[Antioxidant]

In the present invention, an antioxidant is preferably added from the standpoint of controlling the oxygen absorbing capability and suppressing deterioration of the mechanical properties. Examples of the antioxidant include a copper antioxidant, a hindered phenol antioxidant, a hindered amine antioxidant, a phosphorus antioxidant and a thio antioxidant, and among these, a hindered phenol antioxidant and a phosphorus antioxidant are preferred.

Specific examples of the hindered phenol antioxidant include triethylene glycol bis[3-(3-t-butyl-5-methyl-4-hydroxyphenyl)propionate, 4,4'-butylidene bis(3-methyl-6-t-butylphenol), 1,6-hexanediol bis[3-(3,5-di-t-butyl-4-hydroxyphenyl)propionate, 2,4-bis(n-octylthio)-6-(4-hydroxy-3,5-di-t-butylanilino)-1,3,5-triazine, pentaerythrityl tetrakis [3-(3,5-di-t-butyl-4-hydroxyphenyl)propionate], 2,2-thiodiethylene bis[3-(3,5-di-t-butyl-4-hydroxyphenyl) propionate], octadecyl 3-(3,5-di-t-butyl-4-hydroxyphenyl) propionate, 2,2-thiobis(4-methyl-6-1-butylphenol), N,N'-hexamethylene bis(3,5-di-t-butyl-4-hydroxy-hydroxycinnamide), 3,5-di-t-butyl-4-hydroxybenzylphosphonate diethyl ester, 1,3,5-trimethyl-2,4,6-tris(3,5-di-butyl-4-hydroxybenzyl)benzene, ethyl calcium bis(3,5-di-t-butyl-4-hydroxybenzylsulfonate, tris(3,5-di-t-butyl-4-hydroxybenzyl) isocyanurate, 2,6-di-t-butyl-p-cresol, butylated hydroxyanisole, 2,6-di-t-butyl-4-ethylphenol, stearyl β-(3,5-di-t-butyl-4-hydroxyphenyl)propionate, 2,2'-methylene bis(4-methyl-6-t-butylphenol), 2,2'-methylene bis(4-ethyl-6-t-butylphenol), 4,4'-thiobis(3-methyl-6-t-butylphenol), octylated diphenylamine, 2,4-bis[(octylthio)methyl]-O-cresol, isooctyl-3-(3,5-di-t-butyl-4-hydroxyphenyl)propionate, 4,4'-butylidene bis(3-methyl-6-t-butylphenol, 3,9-bis[1,1-dimethyl-2-[β-(3-t-butyl-4-hydroxy-5-methylphenyl)propionyloxy]ethyl]-2,4,8,10-tetraoxaspiro[5.5]undecane, 1,1,3-tris(2-methyl-4-hydroxy-5-t-butylphenyl)butane, 1,3,5-trimethyl-2,4,6-tris (3,5-di-t-butyl-4-hydroxybenzyl)benzene, bis[3,3'-bis(4'-hydroxy-3'-t-butylphenyl)butyric acid]glycol ester, 1,3,5-tris(3',5'-di-t-butyl-4'-hydroxybenzyl)-sec-triazin-2,4,6-(1H, 3H,5H)trione and d-α-tocopherol. These compounds may be used solely or as a mixture thereof. Specific examples of the commercially available product of the hindered phenol compound include Irganox 1010 and Irganox 1098 (both trade names), produced by BASF AG.

Specific examples of the phosphorus antioxidant include organic phosphorus compounds, such as triphenyl phosphite, trioctadecyl phosphite, tridecyl phosphite, trinonylphenyl phosphite, diphenylisodecyl phosphite, bis(2,6-di-tert-butyl-4-methylphenyl)pentaerythritol diphosphite, bis (2,4-di-tert-butylphenyl)pentaerythritol diphosphite, tris(2, 4-di-tert-butylphenyl)phosphite, distearyl pentaerythritol diphosphite, tetra(tridecyl-4,4'-isopropylidenediphenyl diphosphite and 2,2-methylene bis(4,6-di-tert-butylphenyl) octyl phosphite. These compounds may be used solely or as a mixture thereof.

The content of the antioxidant in the polyamide composition is not particularly limited in such a range that does not impair the capabilities of the composition, and is preferably from 0.001 to 3% by mass, and more preferably from 0.01 to 1% by mass, in the oxygen absorbing barrier layer, from the standpoint of controlling the oxygen absorbing capability and suppressing deterioration of the mechanical properties.

[Other Additives]

To the oxygen absorbing barrier layer, additives may be added depending on the required purposes and capabilities, such as a lubricant, a matting agent, a heat resistant stabilizer, a weather resistant stabilizer, an ultraviolet ray absorbent, a plasticizer, a flame retardant, an antistatic agent, a coloration preventing agent and a crystallization nucleating agent. The additives may be added depending on necessity in such a range that does not impair the advantages of the present invention.

2. Layer (B) Containing Resin (B) as Major Component

The layer (B) in the present invention is a layer containing a resin (B) as a major component. The term "as a major component" herein means that the layer (B) contains the resin (B) in an amount of 70% by mass or more, preferably 80% by mass or more, and more preferably from 90 to 100% by mass. The layer (B) may further contain, in addition to the resin (B), the additive (C) mentioned above depending on the desired capabilities and the like.

The multilayer injection molded article of the present invention may have plural layers (B), and the structures of the plural layers (B) may be the same as or different from each other.

The thickness of the layer (B) may be appropriately determined depending on the purposes, and is preferably from 5 to 200 µm, more preferably from 10 to 150 µm, and further preferably from 15 to 100 µm, from the standpoint of ensuring the strength, such as the drop resistance, and the properties, such as the flexibility, that are required for the multilayer injection molded article.

2-1. Resin (B)

In the present invention, the resin (B) used may be an arbitrary resin without any particular limitation. Examples of the resin (B) include a thermoplastic resin, and specific examples thereof include a polyolefin, a polyester, a polyamide, an ethylene-vinyl alcohol copolymer, and a plant-derived resin. In the present invention, the resin (B) preferably contains at least one selected from the group consisting of these resins.

[Polyolefin]

Specific examples of the polyolefin include an olefin homopolymer, such as polyethylene (e.g., low density polyethylene, medium density polyethylene, high density polyethylene and linear low density polyethylene), polypropylene, polybutene-1 and poly-4-methylpentene-1; a copolymer of ethylene and an α-olefin, such as an ethylene-propylene random copolymer, an ethylene-propylene block copolymer, an ethylene-propylene-polybutene-1 copolymer and an ethylene-cyclic olefin copolymer; an ethylene copolymer, such as an ethylene-α,β-unsaturated carboxylic acid copolymer, e.g., an ethylene-(meth)acrylic acid copolymer, an ethylene-α,β-unsaturated carboxylate ester copolymer, such as an ethylene-ethyl(meth)acrylate copolymer, an ionically crosslinked product of an ethylene-α,β-unsaturated carboxylic acid copolymer, and an ethylene-vinyl acetate copolymer; and a graft-modified polyolefin obtained by graft-modifying these polyolefins with an acid anhydride, such as maleic anhydride.

[Polyester]

In the present invention, the polyester includes ones formed of one kind or two or more kinds selected from a polybasic carboxylic acid including a dicarboxylic acid and an ester forming derivative thereof and one kind or two or more kinds selected from a polyhydric alcohol including a glycol, ones formed of a hydroxycarboxylic acid or an ester forming derivative thereof, and ones formed of a cyclic ester.

An ethylene terephthalate thermoplastic polyester preferably contains an ethylene terephthalate unit as the most part of the ester repeating units, generally in an amount of 70% by mol or more, and preferably has a glass transition point (Tg) in a range of from 50 to 90° C. and a melting point (Tm) in a range of from 200 to 275° C. As the ethylene terephthalate thermoplastic polyester, polyethylene terephthalate is particularly excellent in pressure resistance, heat resistance, thermopressure resistance and the like, and a copolymer polyester containing in addition to the ethylene terephthalate unit a small amount of an ester unit formed of a dibasic acid, such as isophthalic acid and naphthalenedicarboxylic acid, and a diol, such as propylene glycol, may also be used.

Examples of the dicarboxylic acid include a saturated aliphatic dicarboxylic acid or an ester forming derivative thereof, such as oxalic acid, malonic acid, succinic acid, glutaric acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 3-cyclobutanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 2,5-norbornanedicarboxylic acid and a dimer acid; an unsaturated aliphatic dicarboxylic acid or an ester forming derivative thereof, such as fumaric acid, maleic acid and itaconic acid; an aromatic dicarboxylic acid or an ester forming derivative thereof, such as orthophthalic acid, isophthalic acid, terephthalic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 4,4'-biphenyldicarboxylic acid, 4,4'-biphenylsulfonedicarboxylic acid, 4,4'-biphenyletherdicarboxylic acid, 1,2-bis(phenoxy)ethane-p,p'-dicarboxylic acid and anthracenedicarboxylic acid; and a metal sulfonate group-containing aromatic dicarboxylic acid or a lower alkyl ester derivative thereof, such as 5-sodium sulfoisophthalate, 2-sodium sulfoterephthalate, 5-lithium sulfoisophthalate, 2-lithium sulfoterephthalate, 5-potassium sulfoisophthalate and 2-potassium sulfoterephthalate.

Among these dicarboxylic acids, terephthalic acid, isophthalic acid and naphthalenedicarboxylic acid are preferably used from the standpoint of the physical characteristics of the resulting polyester, and another dicarboxylic acid may be copolymerized therewith depending on necessity.

Examples of the polybasic carboxylic acid other than these dicarboxylic acids include ethanetricarboxylic acid, propanetricarboxylic acid, butanetetracarboxylic acid, pyromellitic acid, trimellitic acid, trimesic acid, 3,4,3',4'-biphenyltetracarboxylic acid, and ester forming derivatives thereof.

Examples of the glycol include an aliphatic glycol, such as ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethylene glycol, 1,12-dodecanediol, polyethylene glycol, polytrimethylene glycol and polytetramethylene glycol, and an aromatic glycol, such as hydroquinone, 4,4'-dihydroxybisphenol, 1,4-bis(β-hydroxyethoxy)benzene, 1,4-bis(β-hydroxyethoxyphenyl)sulfone, bis(p-hydroxyphenyl) ether, bis(p-hydroxyphenyl)sulfone, bis(p-hydroxyphenyl)methane, 1,2-bis(p-hydroxyphenyl)ethane, bisphenol A, bisphenol C, 2,5-naphthalenediol, glycols formed by adding ethylene oxide to these glycols.

Among these glycols, ethylene glycol, 1,3-propylene glycol, 1,4-butylene glycol and 1,4-cyclohexanedimethanol are preferably used as a major component. Examples of the polyhydric alcohol other than these glycols include trimethylolmethane, trimethylolethane, trimethylolpropane, pentaerythritol, glycerol and hexanetriol.

Examples of the hydroxycarboxylic acid include lactic acid, citric acid, malic acid, tartaric acid, hydroxyacetic acid, 3-hydroxybutyric acid, p-hydroxybenzoic acid, p-(2-hydroxyethoxy)benzoic acid, 4-hydroxycyclohexanecarboxylic acid, and ester forming derivatives thereof.

Examples of the cyclic ester include ε-caprolactone, β-propiolactone, β-methyl-β-propiolactone, δ-valerolactone, glycolide and lactide.

Examples of the ester forming derivative of the polybasic carboxylic acid and the hydroxycarboxylic acid include an alkyl ester, an acid chloride and an acid anhydride thereof.

The polyester used in the present invention is preferably a polyester containing terephthalic acid or an ester forming derivative thereof or naphthalenedicarboxylic acid or an ester forming derivative thereof as a major acid component, and an alkylene glycol as a major glycol component.

The polyester containing terephthalic acid or an ester forming derivative thereof as a major acid component is preferably a polyester containing terephthalic acid or an ester forming derivative thereof in an amount of 70% by mol or more based on the total acid components, more preferably a polyester containing it in an amount of 80% by mol or more, and further preferably a polyester containing it in an amount of 90% by mol or more. Similarly, the polyester containing naphthalenedicarboxylic acid or an ester forming derivative thereof as a major acid component is preferably a polyester containing naphthalenedicarboxylic acid or an ester forming derivative thereof in an amount of 70% by mol or more based on the total acid components, more preferably a polyester containing it in an amount of 80% by mol or more, and further preferably a polyester containing it in an amount of 90% by mol or more.

The naphthalenedicarboxylic acid or an ester forming derivative thereof used in the present invention is preferably 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, or an ester forming derivative thereof shown in examples of the dicarboxylic acid described above.

The polyester containing an alkylene glycol as a major glycol component is preferably a polyester containing an alkylene glycol in an amount of 70% by mol or more based on the total glycol components, more preferably a polyester containing it in an amount of 80% by mol or more, and further preferably a polyester containing it in an amount of 90% by mol or more. The alkylene glycol referred herein may contain a substituent and an alicyclic structure in the molecular chain.

The copolymerization component other than terephthalic acid and ethylene glycol is preferably at least one selected from the group consisting of isophthalic acid, 2,6-naphthalenedicarboxylic acid, diethylene glycol, neopentyl glycol, 1,4-cyclohexanedimethanol, 1,2-propanediol, 1,3-propanediol and 2-methyl-1,3-propanediol, for achieving both the transparency and the moldability, and is particularly preferably at least one selected from the group consisting of isophthalic acid, diethylene glycol, neopentyl glycol and 1,4-cyclohexanedimethanol.

Preferred examples of the polyester used in the present invention include a polyester containing ethylene terephthalate as a major repeating unit, more preferably a linear polyester containing an ethylene terephthalate unit in an amount of 70% by mol or more, further preferably a linear polyester containing an ethylene terephthalate unit in an amount of 80% by mol or more, and particularly preferably a linear polyester containing an ethylene terephthalate unit in an amount of 90% by mol or more.

Other preferred examples of the polyester used in the present invention include a polyester containing ethylene 2,6-naphthalate as a major repeating unit, more preferably a linear polyester containing an ethylene 2,6-naphthalate unit in an amount of 70% by mol or more, further preferably a linear polyester containing an ethylene 2,6-naphthalate unit in an amount of 80% by mol or more, and particularly preferably a linear polyester containing an ethylene 2,6-naphthalate unit in an amount of 90% by mol or more.

Other preferred examples of the polyester used in the present invention include a linear polyester containing a propylene terephthalate unit in an amount of 70% by mol or more, a linear polyester containing a propylene naphthalate unit in an amount of 70% by mol or more, a linear polyester containing a 1,4-cyclohexanedimethylene terephthalate unit in an amount of 70% by mol or more, a linear polyester containing a butylene naphthalate unit in an amount of 70% by mol or more, and a linear polyester containing a butylene terephthalate unit in an amount of 70% by mol or more.

In particular, the total composition of the polyester is preferably a combination of terephthalic acid/isophthalic acid/ethylene glycol, a combination of terephthalic acid/ethylene glycol/1,4-cyclohexanedimethanol, and a combination of terephthalic acid/ethylene glycol/neopentyl glycol, for achieving both the transparency and the moldability. The polyester may contain diethylene glycol in a small amount (5% by mol or less) that is formed through dimerization of ethylene glycol during the esterification (ester exchange) reaction and the polycondensation reaction.

Other preferred examples of the polyester used in the present invention include a polyglycolic acid formed by polycondensation of glycolic acid or methyl glycolate, or ring-opening polycondensation of glycolide. The polyglycolic acid may be copolymerized with another component, such as lactide.

[Polyamide]

Examples of the polyamide used in the present invention (the "polyamide" referred herein is not the "polyamide resin (A)" of the present invention) include a polyamide containing a unit derived from a lactam or an aminocarboxylic acid as a major constitutional unit, an aliphatic polyamide containing a unit derived from an aliphatic diamine and an aliphatic dicarboxylic acid as a major constitutional unit, a partially aromatic polyamide containing a unit derived from an aliphatic diamine and an aromatic dicarboxylic acid as a major constitutional unit, and a partially aromatic polyamide containing a unit derived from an aromatic diamine and an aliphatic dicarboxylic acid as a major constitutional unit, and a monomer unit other than the major constitutional unit may be copolymerized therewith depending on necessity.

Examples of the lactam or aminocarboxylic acid used include a lactam, such as ε-caprolactam and laurolactam, an aminocarboxylic acid compound, such as aminocaproic acid and aminoundecanoic acid, and an aromatic aminocarboxylic acid, such as p-aminomethylbenzoic acid.

Examples of the aliphatic diamine used include an aliphatic diamine having from 2 to 12 carbon atoms and a functional derivative thereof. An alicyclic diamine may also be used therefor. The aliphatic diamine may be a linear aliphatic diamine or an aliphatic diamine having a branched chain form. Specific examples of the linear aliphatic diamine include an aliphatic diamine, such as ethylenediamine, 1-methylethylenediamine, 1,3-propylenediamine, tetramethylenediamine, pentamethylenediamine, hexamethylenediamine, heptamethylenediamine, octamethylenediamine, nonamethylenediamine, decamethylenediamine, undecamethylenediamine and dodecamethylenediamine. Specific examples of the alicyclic diamine include cyclohexanediamine, 1,3-bis(aminomethyl)cyclohexane and 1,4-bis(aminomethyl)cyclohexane.

The aliphatic dicarboxylic acid is preferably a linear aliphatic dicarboxylic acid or an alicyclic dicarboxylic acid, and particularly preferably a linear aliphatic dicarboxylic acid having an alkylene group having from 4 to 12 carbon atoms. Examples of the linear aliphatic dicarboxylic acid include adipic acid, sebacic acid, malonic acid, succinic acid, glutaric acid, pimelic acid, suberic acid, azelaic acid, undecanoic acid, undecadioic acid, dodecanedioic acid, a dimer acid, and functional derivatives thereof. Examples of the alicyclic dicarboxylic acid include alicyclic dicarboxylic acids, such as 1,4-cyclohexanedicarboxylic acid, hexahydroterephthalic acid and hexahydroisophthalic acid.

Examples of the aromatic diamine include m-xylylenediamine, p-xylylenediamine and p-bis(2-aminoethyl)benzene.

Examples of the aromatic dicarboxylic acid include terephthalic acid, isophthalic acid, phthalic acid, 2,6-naphthalenedicarboxylic acid, diphenyl-4,4'-dicarboxylic acid, diphenoxyethanedicarboxylic acid, and functional derivatives thereof.

Specific examples of the polyamide include polyamide 4, polyamide 6, polyamide 10, polyamide 11, polyamide 12, polyamide 4,6, polyamide 6,6, polyamide 6,10, polyamide 6T, polyamide 9T, polyamide 6IT, poly-m-xylylene adipamide (polyamide MXD6), isophthalic acid-copolymerized poly-m-xylylene adipamide (polyamide MXD6I), poly-m-xylylene sebacamide (polyamide MXD10), poly-m-xylylene dodecanamide (polyamide MXD12), poly-1,3-bis (aminomethyl)cyclohexane adipamide (polyamide BAC6) and poly-p-xylylene sebacamide (polyamide PXD10). More preferred examples of the polyamide include polyamide 6, polyamide MXD6 and polyamide MXD6I.

The copolymerization component of the polyamide may be a polyether having at least one terminal amino group or terminal carboxyl group having a number average molecular weight of from 2,000 to 20,000, an organic carboxylate salt of the polyether having a terminal amino group, or an amino salt of the polyether having a terminal carboxyl group. Specific examples thereof include bis(aminopropyl)poly (ethyleneoxide) (polyethylene glycol having a number average molecular weight of from 2,000 to 20,000).

The partially aromatic polyamide may contain a constitutional unit derived from a tribasic or higher basic carboxylic acid, such as trimellitic acid and pyromellitic acid, in such a range that the partially aromatic polyamide is substantially linear.

The polyamide may be produced a melt polycondensation method in the presence of water, a melt polycondensation method in the absence of water, or a method of subjecting a polyamide obtained by the melt polycondensation method further to solid phase polymerization, which are basically known in the art. The melt polycondensation reaction may be performed by one step, or may be performed by dividing into plural steps. The reaction may be performed with a batch reaction apparatus or a continuous reaction apparatus. The melt polycondensation step and the solid phase polymerization step may be performed continuously or separately.

[Ethylene-Vinyl Alcohol Copolymer]

The ethylene-vinyl alcohol copolymer used in the present invention is not particularly limited, and preferably has an ethylene content of from 15 to 60% by mol, more preferably from 20 to 55% by mol, and further preferably from 29 to 44% by mol, and preferably has a saponification degree of the vinyl acetate component of 90% by mol or more, and more preferably 95% by mol or more.

The ethylene-vinyl alcohol copolymer may contain a small amount of a comonomer, such as an α-olefin, e.g., propylene, isobutene, α-octene, α-dodecene and α-octadecene, an unsaturated carboxylic acid or a salt, a partial alkyl ester, a complete alkyl ester, a nitrile, an amide or an anhydride thereof, or an unsaturated sulfonic acid or a salt thereof.

[Plant-Derived Resin]

Examples of the plant-derived resin include various known aliphatic polyester biodegradable resins derived from other materials than petroleum oils, with no particular limitation, while they partially overlap the aforementioned resins. Examples of the aliphatic polyester biodegradable resin include a poly(α-hydroxy acid), such as polyglycolic acid (PGA) and polylactic acid (PLA); and a polyalkylene alkanoate, such as polybutylene succinate (PBS) and polyethylene succinate (PES).

3. Optional Layer

The multilayer injection molded article of the present invention may contain, in addition to the layers (A) and (B), an optional layer depending on the desired capabilities and the like. Examples of the optional layer include an adhesive layer and the like.

3-1. Adhesive Layer

In the multilayer injection molded article of the present invention, in the case where a practical interlayer adhesive strength may not be obtained between adjacent two layers, an adhesive layer is preferably provided between the layers. The adhesive layer preferably contains a thermoplastic resin having adhesiveness. Examples of the thermoplastic resin having adhesiveness include an acid-modified polyolefin resin formed by modifying a polyolefin resin, such as polyethylene and polypropylene, with an unsaturated carboxylic acid, such as acrylic acid, methacrylic acid, maleic acid, maleic anhydride, fumaric acid and itaconic acid, and a polyester thermoplastic elastomer containing a polyester block copolymer as a major component. The adhesive layer used is preferably a layer of a resin that is formed by modifying the same kind as the resin (B) used in the layer (B), from the standpoint of the adhesiveness.

The thickness of the adhesive layer is preferably from 2 to 100 μm, more preferably from 5 to 90 μm, and further preferably from 10 to 80 μm, from the standpoint of ensuring the molding processability while exhibiting a practical adhesive strength.

4. Multilayer Injection Molded Article and Production Method Thereof

The production method and the layer structure of the multilayer injection molded article of the present invention are not particularly limited, and the multilayer injection molded article may be produced by an ordinary injection molding method. For example, by using a molding machine equipped with two or more injection devices, and an injection mold, the material constituting the layer (A) and the material constituting the layer (B) may be injected respectively from the injection cylinders into the cavity through the hot runners of the mold, thereby producing the multilayer injection molded article according to the shape of the injection mold. Furthermore, the multilayer injection molded article having a three-layer structure B/A/B may be produced in such a manner that the material constituting the layer (B) is injected from the injection cylinder, then the material constituting the layer (A) is injected from another injection cylinder simultaneously with the resin constituting the layer (B), and then the resin constituting the layer (B) is injected in the necessary amount to fill the cavity.

The multilayer injection molded article having a five-layer structure B/A/B/A/B may be produced in such a manner that the material constituting the layer (B) is injected, then the material constituting the layer (A) is solely injected, and then the material constituting the layer (B) is finally injected in the necessary amount to fill the mold cavity.

The multilayer injection molded article having a five-layer structure B1/B2/A/B2/B1 may be produced in such a manner that the material constituting the layer (B1) is injected from the injection cylinder, then the material constituting the layer (B2) is injected from another injection cylinder simultaneously with the resin constituting the layer (B1), then the resin constituting the layer (A) is injected simultaneously with the resins constituting the layer (B1) and the layer (B2), and then the resin constituting the layer (B1) is injected in the necessary amount to fill the mold cavity.

Separately from the injection molding method, the multilayer molded article may be obtained by the compression molding method. For example, the molded article may be obtained in such a manner that an oxygen absorbing resin agent is provided in a molten thermoplastic resin, and the molten matter is fed to the positive mold and simultaneously compressed with the negative mold, followed by cooling and solidifying the compression molded article.

The mouth and neck portion of the resulting molded article may be crystallized in this stage through a heat treatment for imparting heat resistance to the mouth and neck portion. The crystallization degree is preferably from 30 to 50%, and more preferably from 35 to 45%. The crystallization may be performed after the secondary processing described later.

In the case where the multilayer injection molded article of the present invention is a container, oxygen inside the container is absorbed as well as oxygen slightly penetrating from the outside of the container, thereby preventing the content to be stored from being degraded with oxygen.

The shape of the multilayer injection molded article of the present invention is not particularly limited and may be in an arbitrary form depending on the mold. In consideration of the fact that the multilayer injection molded article of the present invention exhibits the oxygen barrier capability and the oxygen absorbing capability, the multilayer injection molded article of the present invention is preferably a storing container, such as a cup container (injection cup) and a bottle container. The multilayer injection molded article of the present invention is also preferably a preform in the form of a test tube (parison) for the secondary processing, such as blow molding, described later for a PET bottle or the like.

<<Container Obtained by Processing Multilayer Injection Molded Article>>

The container obtained by secondarily processing the multilayer injection molded article of the present invention absorbs oxygen inside the container as well as oxygen slightly penetrating from the outside of the container, thereby preventing the content to be stored from being degraded with oxygen.

Examples of the secondary processing include blow molding and stretching blow molding, and examples of the container obtained by the secondary processing include a bottle.

In the injection blow molding, a preform in the form of a test tube (parison) is molded as the multilayer injection molded article of the present invention, then the mouth portion of the heated preform is fixed to a jig, the preform is set in a mold with a final shape, and the preform is blown and closely attached to the mold by blowing air from the mouth portion, followed by cooling and solidifying, thereby molding into the form of a bottle.

In the injection stretching blow molding, the mouth portion of the heated preform is fixed to a jig, the preform is set in a mold with a final shape, and the preform is blown and closely attached to the mold by blowing air from the mouth portion while stretching with a stretching rod at the mouth portion, followed by cooling and solidifying, thereby molding into the form of a bottle.

The injection stretching blow molding method is roughly classified into a hot parison method and a cold parison method. In the former method, the preform is not completely cooled, but is subjected to blow molding in the softened state. In the latter cold parison method, on the other hand, the preform is molded as a supercooled preform with a bottom, in which the resin is in an amorphous state, having a dimension that is certainly smaller than the final shape, and the preform is preliminarily heated to the stretching temperature thereof, and then blow stretched into the circumferential direction while stretching in the axial direction, inside the mold with a final shape. The cold parison method is suitable for mass production. In both the methods, the multilayer preform is heated to the stretching temperature, which is higher than the glass transition point (Tg), and then the preform is stretched in the longitudinal direction with a stretching rod and stretched in the transversal direction by blowing air according to the stretching blow molding method inside the mold with a final shape heated to a heat treatment (heat set) temperature. The stretching ratio of the final blow molded article is preferably from 1.2 to 6 times in the longitudinal direction and from 1.2 to 4.5 times in the transversal direction.

The mold with a final shape is heated to the temperature, at which the crystallization of the resin is accelerated, for example, from 120 to 230° C., preferably from 130 to 210° C., for a PET resin, and upon blowing, the outer surface of the container wall of the molded article is made in contact with the inner surface of the mold for a prescribed period of time, thereby performing the heat treatment. After performing the heat treatment for a prescribed period of time, the blowing fluid is switched to an internal cooling fluid, thereby cooling the inner layer. The heat treating time is generally from 1.5 to 30 seconds, and particularly from 2 to 20 seconds, for a PET resin although it changes depending on the thickness and the temperature of the blow molded article. The cooling time is generally from 0.1 to 30 seconds, and particularly from 0.2 to 20 seconds, although it changes depending on the heat treating temperature and the kind of the cooling fluid. The each part of the molded article is crystallized through the heat treatment.

Examples of the cooling fluid used include air at ordinary temperature and various kinds of cooled gas, for example, nitrogen, air and carbon dioxide gas at −40° C. to +10° C., and chemically inert liquefied gas, such as liquefied nitrogen gas, liquefied carbon dioxide gas, liquefied trichlorofluoromethane gas, liquefied dichlorodifluoromethane gas, and other liquefied aliphatic hydrocarbon gas. Liquid mist with large vaporization heat, such as water, may be present in the cooling fluid. By using the cooling fluid described above, a considerably large cooling temperature may be obtained. In the stretching blow molding, two molds may be used, in which the heat treatment may be performed within the prescribed ranges of temperature and period of time in the first mold, and then the blow molded article is transferred to the second mold for performing blowing the blow molded article again and simultaneously cooling the same. The outer layer of the blow molded article taken out from the mold is cooled by being allowed to cool or by blowing cold air thereto.

As another production method of the blow molded article, two-stage blow molding may be employed, in which the multilayer preform is molded with a primary stretching blow mold into a primary blow molded article having a larger dimension than the final blow molded article, and subsequently, the primary blow molded article is shrunk under heating, and then subjected to stretching blow molding with a secondary mold, thereby providing the final blow molded article. According to this production method of the blow molded article, the bottom portion of the blow molded article is sufficiently stretched and thinned, thereby providing a blow molded article excellent in hot charging, deformation of the bottom portion upon heat sterilization, and impact resistance.

The injection molded article and the container obtained by secondarily processing the same of the present invention may have, coated thereon, a vapor deposition film of an inorganic material or an inorganic oxide, and an amorphous carbon film.

Examples of the inorganic material and the inorganic oxide include aluminum, alumina and silicon oxide. The vapor deposition film of an inorganic material or an inorganic oxide may block eluted substances, such as acetaldehyde and formaldehyde, from the injection molded article and the container obtained by secondarily processing the same of the present invention. The formation method of the vapor deposition film is not particularly limited, and examples thereof include a physical vapor deposition method, such as a vacuum vapor deposition method, a sputtering method and an ion plating method, and a chemical vapor deposition method, such as PECVD. The thickness of the vapor deposition film is preferably from 5 to 500 nm, and more preferably from 5 to 200 nm, from the standpoint of the gas barrier property, the light shielding property and the flexural resistance.

The amorphous carbon film is a diamond-like carbon film, and is a hard carbon film, which may be referred to as an i-carbon film or a hydrogenated amorphous carbon film. Examples of the formation method of the film include a method, in which an interior of a hollow molded article is evacuated to make vacuum, to which a carbon source gas is fed, and energy for forming plasma is fed thereto to make plasma of the carbon source gas. According to the method, the amorphous carbon film can be formed on the inner surface of the container. The amorphous carbon film not only considerably decreases the permeability to low molecular weight inorganic gas, such as oxygen and carbon dioxide, but also suppresses sorption of various low molecular weight organic compounds having odor. The thickness of the amorphous carbon film is preferably from 50 to 5,000 nm from the standpoint of the sorption suppressing effect to low molecular weight organic compounds, the enhancing effect of the gas barrier property, the adhesion to plastics, the durability, the transparency and the like.

The injection molded article and the container obtained by secondarily processing the same of the present invention are excellent in oxygen absorbing capability and oxygen barrier property, and are also excellent in flavor retaining property for contents thereof, and thus the injection molded article and the container are suitable for packaging various articles.

Examples of the articles to be stored include various articles, for example, beverages, such as milk, milk products, juice, coffee, tea beverages and alcohol beverages; liquid seasonings, such as Worcester sauce, soy sauce and dressing; cooked foods, such as soup, stew, curry, infant cooked foods and nursing care cooked foods; paste foods, such as jam and mayonnaise; processed seafood, such as tuna and other seafood; processed milk products, such as cheese and butter; processed meat products, such as dressed meat, salami, sausage and ham; vegetables, such as carrot and potato; egg; noodles; processed rice products, such as uncooked rice, cooked rice and rice porridge; dry foods, such as powder seasonings, powder coffee, infant powder milk, powder diet foods, dried vegetables and rice crackers; chemicals, such as agrichemicals and insecticides; medical drugs; cosmetics; pet foods; and sundry articles, such as shampoo, conditioner and cleanser.

The injection molded article and the container are particularly suitable as a packaging material for contents that are liable to be degraded in the presence of oxygen, for example, beverages including beer, wine, fruit juice, carbonated beverages and the like, foods including fruits, nuts, vegetables, meat products, infant foods, coffee, jam, mayonnaise, ketchup, food oil, dressing, sauce, soy sauce boiled foods, dairy products and the like, and other products including medical drugs, cosmetics and the like.

Furthermore, before or after charging the article to be stored, the injection molded article and the container obtained by secondarily processing the same of the present invention and the article to be stored may be subjected to sterilization in the form suitable for the article to be stored. Examples of the sterilization method include heat sterilization, such as a hydrothermal treatment at 100° C. or lower, a pressurized hydrothermal treatment at 100° C. or higher, and an ultrahigh temperature heat treatment at 130° C. or higher; electromagnetic wave sterilization, such as an ultraviolet ray, a microwave and a gamma wave; a gas treatment, such as ethylene oxide gas; and chemical sterilization, such as hydrogen peroxide and hypochlorous acid.

EXAMPLES

The present invention will be described in more detail with reference to examples below, but the present invention is not limited to the examples.

In the following examples, with respect to the units constituting the copolymers, a unit derived from m-xylylenediamine is referred to as "MXDA", a unit derived from 1,3-bis(aminomethyl)cyclohexane is referred to as "1,3BAC", a unit derived from hexamethylenediamine is referred to as "HMDA", a unit derived from adipic acid is referred to as "AA", a unit derived from isophthalic acid is referred to as "IPA", a unit derived from DL-alanine is referred to as "DL-Ala", a unit derived from DL-leucine is referred to as "DL-Leu", and a unit derived from ε-caprolactam is referred to as "ε-CL".

Further, poly-m-xylylene adipamide is referred to as "N-MXD6".

The polyamide resins obtained in Production Examples were measured for the α-amino acid content, the relative viscosity, the terminal amino group concentration, the glass transition temperature and the melting point in the following manners. Films were produced with the polyamide resins obtained in Production Examples and were measured for the oxygen absorbing amount in the following manner.

(1) α-Amino Acid Content

The α-amino acid content of the polyamide resin was quantitatively determined with $^1$H-NMR (400 MHz, JNM-AL400, a trade name, produced by JEOL, Ltd., measurement mode: NON($^1$H)). Specifically, a 5% by mass solution of the polyamide resin was prepared with formic acid-d as a solvent, and subjected to the $^1$H-NMR measurement.

(2) Relative Viscosity 1 g of a pellet sample was precisely weighed and dissolved in 100 mL of 96% sulfuric acid at 20 to 30° C. under stirring. After completely dissolved, 5 mL of the solution was quickly placed in a Cannon-Fenske viscometer, which was then allowed to stand in a thermostat chamber at 25° C. for 10 minutes, and then the fall time (t) was measured. The fall time ($t_0$) of 96% sulfuric acid was measured in the same manner. The relative viscosity was calculated from t and $t_0$ according to the following expression.

$$\text{Relative viscosity}=t/t_0$$

(3) Terminal Amino Group Concentration [$NH_2$]

The polyamide resin was precisely weighed and dissolved in a solution of phenol/ethanol=4/1 by volume at 20 to 30° C. under stirring. After completely dissolved, under stirring, the inner wall of the container was washed out with 5 mL of methanol, and the solution was subjected to neutralization titration with a 0.01 mol/L hydrochloric acid aqueous solution, thereby measuring the terminal amino group concentration [$NH_2$].

(4) Glass Transition Temperature and Melting Point

DSC measurement (differential scanning calorimeter measurement) was performed with a differential scanning calorimeter (DSC-60, a trade name, produced by Shimadzu Corporation) at a temperature increasing rate of 10° C./min under a nitrogen stream, thereby measuring the glass transition temperature (Tg) and the melting point (Tm).

(5) Oxygen Absorbing Amount

The polyamide resin was molded into a non-stretched single layer film having a thickness of approximately 100 µm with a twin screw extruder having a diameter of 30 mm equipped with a T-die (produced by PLABOR Research Laboratory of Plastics Technology Co., Ltd.) at a cylinder and T-die temperature of (melting point of polyamide resin +20° C.).

Two sheets of specimens having a dimension of 10 cm×10 cm cut out from the non-stretched single layer film thus produced were charged in a bag formed of an aluminum laminated film sealed on three edges thereof having a dimension of 25 cm×18 cm along with cotton impregnated with 10 mL of water, and the bag was sealed to make an air amount inside the bag of 400 mL. The humidity in the bag was 100% RH (relative humidity). After storing at 40° C. for 7 days, 14 days and 28 days, the oxygen concentrations inside the bag each were measured with an oxygen concentration meter (LC-700F, a trade name, produced by Toray Engineering Co., Ltd.), and the oxygen absorbing amount was calculated from the oxygen concentration.

Production Example 1 (Production of Polyamide Resin 1)

In a pressure-resistant reaction vessel having an inner capacity of 50 L, equipped with a stirrer, a partial condenser, a total condenser, a pressure regulator, a thermometer, a dropping vessel, a pump, an aspirator, a nitrogen introducing tube, a flash valve and a strand die, 13,000 g (88.96 mol) of precisely weighed adipic acid (produced by Asahi Kasei Chemicals Corporation), 880.56 g (9.88 mol) of DL-alanine (produced by Musashino Chemical Laboratory, Ltd.), 11.7 g (0.11 mol) of sodium hypophosphite and 6.06 g (0.074 mol) of sodium acetate were placed, and after sufficiently replacing with nitrogen, the reaction vessel was sealed, and the system was heated to 170° C. under stirring while maintaining the inside of the vessel to 0.4 MPa. After reaching 170° C., 12,082.2 g (88.71 mol) of m-xylylenediamine (produced by Mitsubishi Gas Chemical Co., Inc.) stored in the dropping vessel was added dropwise to the molten raw materials in the reaction vessel, and the inside of the reaction vessel was continuously heated to 240° C. while maintaining the inside of the vessel to 0.4 MPa and removing condensation water formed. After completing the dropwise addition of m-xylylenediamine, the inside of the reaction vessel was gradually returned to the atmospheric pressure, and then the inside of the reaction vessel was depressurized with the aspirator to 80 kPa for removing condensation water. The stirring torque of the stirrer was observed during the depressurization. At the time when the torque reached a prescribed value, the stirring was stopped, the inside of the reaction vessel was pressurized with nitrogen, the flash valve was opened, and the polymer was taken out from the strand die, and cooled and pelletized with a pelletizer. The pellets were charged in a stainless steel rotation drum heating apparatus, which was rotated at 5 rpm. After sufficiently substituting with nitrogen, and the inside of the reaction system was heated from room temperature to 140° C. under a small amount of a nitrogen stream. At the time when the temperature inside the reaction system reached 140° C., the system was depressurized to 1 torr or less, and the temperature inside the system was increased to 180° C. over 110 minutes. From the time when the temperature inside the system reached 180° C., the solid phase polymerization reaction was continued at that temperature for 180 minutes. After completing the reaction, depressurization was terminated, the temperature inside the system was decreased under a nitrogen stream, and at the time when the temperature reached 60° C., the pellets were taken out, thereby providing an MXDA/AA/DL-Ala copolymer (polyamide resin 1). The charged composition of the monomers was m-xylylenediamine/adipic acid/DL-alanine=47.3/47.4/5.3 (% by mol).

Production Example 2 (Production of Polyamide Resin 2)

An MXDA/AA/DL-Ala copolymer (polyamide resin 2) was obtained in the same manner as in Production Example 1 except that the charged composition of the monomers was changed to m-xylylenediamine/adipic acid/DL-alanine=44.4/44.5/11.1 (% by mol).

Production Example 3 (Production of Polyamide Resin 3)

An MXDA/AA/DL-Ala copolymer (polyamide resin 3) was obtained in the same manner as in Production Example 1 except that the charged composition of the monomers was changed to m-xylylenediamine/adipic acid/DL-alanine=41.1/41.3/17.6 (% by mol).

Production Example 4 (Production of Polyamide Resin 4)

An MXDA/AA/DL-Ala copolymer (polyamide resin 4) was obtained in the same manner as in Production Example 1 except that the charged composition of the monomers was changed to m-xylylenediamine/adipic acid/DL-alanine=33.3/33.4/33.3 (% by mol).

Production Example 5 (Production of Polyamide Resin 5)

An MXDA/AA/DL-Leu copolymer (polyamide resin 5) was obtained in the same manner as in Production Example 1 except that the α-amino acid was changed to DL-leucine (produced by Ningbo Haishuo Bio-technology Co., Ltd.), and the charged composition of the monomers was changed to m-xylylenediamine/adipic acid/DL-leucine=44.3/44.6/11.1 (% by mol).

Production Example 6 (Production of Polyamide Resin 6)

An MXDA/AA/IPA/DL-Ala copolymer (polyamide resin 6) was obtained in the same manner as in Production Example 1 except that the dicarboxylic acid component was changed to a mixture of isophthalic acid (produced by A.G. International Chemical Co., Inc.) and adipic acid, and the charged composition of the monomers was changed to m-xylylenediamine/adipic acid/isophthalic acid/DL-alanine=44.3/39.0/5.6/11.1 (% by mol).

Production Example 7 (Production of Polyamide Resin 7)

An MXDA/AA/DL-Leu/ε-CL copolymer (polyamide resin 7) was obtained in the same manner as in Production Example 1 except that ε-caprolactam (produced by Ube Industries, Ltd.) was used as a comonomer, the α-amino acid was changed to DL-leucine, and the charged composition of the monomers was changed to m-xylylenediamine/adipic acid/DL-leucine/ε-caprolactam=41.0/41.3/11.8/5.9 (% by mol).

Production Example 8 (Production of Polyamide Resin 8)

An MXDA/1,3BAC/AA/DL-Ala copolymer (polyamide resin 8) was obtained in the same manner as in Production Example 1 except that the diamine component was changed to a mixture of 1,3-bis(aminomethyl)cyclohexane (produced by Mitsubishi Gas Chemical Co., Inc.) and m-xylylenediamine, and the charged composition of the monomers was changed to m-xylylenediamine/1,3-bis(aminomethyl)cyclohexane/adipic acid/DL-alanine=33.2/11.1/44.6/11.1 (% by mol).

Production Example 9 (Production of Polyamide Resin 9)

An MXDA/HMDA/AA/DL-Ala copolymer (polyamide resin 9) was obtained in the same manner as in Production Example 1 except that the diamine component was changed to a mixture of hexamethylenediamine (produced by Showa Chemical Industry Co., Ltd.) and m-xylylenediamine, and the charged composition of the monomers was changed to m-xylylenediamine/hexamethylenediamine/adipic acid/DL-alanine=33.3/11.1/44.5/11.1 (% by mol).

Production Example 10 (Production of Polyamide Resin 10)

N-MXD6 (polyamide resin 10) was obtained in the same manner as in Production Example 1 except that DL-alanine was not added, and the charged composition of the monomers was changed to m-xylylenediamine/adipic acid=49.8/50.2 (% by mol).

Table 1 shows the charged monomer composition of the polyamide resins 1 to 10, and the measurement results of the α-amino acid content, the relative viscosity, the terminal amino group concentration, the glass transition temperature, the melting point and the oxygen absorbing amount of the resulting polyamide resins.

TABLE 1

| | | | Unit | Production Example 1 | Production Example 2 | Production Example 3 | Production Example 4 | Production Example 5 |
|---|---|---|---|---|---|---|---|---|
| | Polyamide No. | | | 1 | 2 | 3 | 4 | 5 |
| Charged monomer composition | aromatic diamine | m-xylylenediamine | mol % | 47.3 | 44.4 | 41.1 | 33.3 | 44.3 |
| | alicyclic diamine | 1,3-bis(aminomethyl)-cyclohexane | mol % | | | | | |
| | aliphatic diamine | hexamethylene-diamine | mol % | | | | | |
| | aliphatic dicarboxylic acid | adipic acid | mol % | 47.4 | 44.5 | 41.3 | 33.4 | 44.6 |
| | aromatic dicarboxylic acid | isophthalic acid | mol % | | | | | |
| | α-amino acid | DL-alanine | mol % | 5.3 | 11.1 | 17.6 | 33.3 | |
| | | DL-leucine | mol % | | | | | 11.1 |
| | amino-carboxylic acid | ε-caprolactam | mol % | | | | | |
| Properties | α-amino acid content | | mol % | 5.3 | 11.0 | 17.6 | 33.1 | 11.1 |
| | relative viscosity | | | 2.4 | 2.3 | 2.1 | 2 | 2.3 |
| | terminal group concentration | [NH$_2$] | μeq/g | 42 | 48 | 55 | 68 | 28 |
| | thermal properties | glass transition temperature Tg | ° C. | 86 | 84 | 83 | 81 | 84 |
| | | melting point Tm | ° C. | 231 | 208 | N.D. | N.D. | 209 |
| | oxygen absorbing amount | after storing 7 days | cc/g | 7 | 9 | 9 | 10 | 7 |
| | | after storing 14 days | cc/g | 15 | 18 | 19 | 21 | 14 |
| | | after storing 28 days | cc/g | 26 | 30 | 32 | 35 | 24 |

| | | | Unit | Production Example 6 | Production Example 7 | Production Example 8 | Production Example 9 | Production Example 10 |
|---|---|---|---|---|---|---|---|---|
| | Polyamide No. | | | 6 | 7 | 8 | 9 | 10 |
| Charged monomer composition | aromatic diamine | m-xylylenediamine | mol % | 44.3 | 41.0 | 33.2 | 33.3 | 49.8 |
| | alicyclic diamine | 1,3-bis(aminomethyl)-cyclohexane | mol % | | | 11.1 | | |
| | aliphatic diamine | hexamethylene-diamine | mol % | | | | 11.1 | |
| | aliphatic dicarboxylic acid | adipic acid | mol % | 39.0 | 41.3 | 44.6 | 44.5 | 50.2 |
| | aromatic dicarboxylic acid | isophthalic acid | mol % | 5.6 | | | | |
| | α-amino acid | DL-alanine | mol % | 11.1 | | 11.1 | 11.1 | |
| | | DL-leucine | mol % | | 11.8 | | | |
| | amino-carboxylic acid | ε-caprolactam | mol % | | 5.9 | | | |
| | α-amino acid content | | mol % | 11.1 | 11.7 | 11.0 | 11.0 | 0.0 |
| Properties | relative viscosity | | | 2.2 | 2.3 | 2.1 | 2.2 | 2.4 |
| | terminal group concentration | [NH$_2$] | μeq/g | 43 | 25 | 45 | 49 | 16 |
| | thermal properties | glass transition temperature Tg | ° C. | 90 | 80 | 90 | 76 | 87 |
| | | melting point Tm | ° C. | N.D. | 223 | N.D. | N.D. | 239 |

TABLE 1-continued

| | | | | | | | |
|---|---|---|---|---|---|---|---|
| oxygen absorbing amount | after storing 7 days | cc/g | 5 | 4 | 7 | 8 | 0 |
| | after storing 14 days | cc/g | 11 | 8 | 16 | 15 | 0 |
| | after storing 28 days | cc/g | 18 | 13 | 28 | 24 | 0 |

N.D.: not detected

In Examples 1 to 41 and Comparative Examples 1 to 18, multilayer injection molded articles and bottles obtained by processing the same were produced by using the polyamide resins 1 to 10.

The oxygen transmission rate, the interlayer delamination resistance and the odor in head space upon opening of the bottles or cups obtained in Examples and Comparative Examples were measured and evaluated in the following manners.

(1) Oxygen Transmission Rate (OTR) of Bottle or Cup

The bottles or cups after 1 day, 7 days, 15 days and 30 days from molding were measured for oxygen transmission rate in accordance with ASTM D3985 in an atmosphere at 23° C., a relative humidity outside the molded article of 50% and a relative humidity inside the same of 100%. For the measurement, an oxygen permeability measuring apparatus (Model OX-TRAN 2-61, produced by Mocon, Inc.) was used. A lower measured value means better oxygen barrier property.

(2) Interlayer Delamination Resistance of Bottle or Cup

Examples 1 to 33 and Comparative Examples 1 to 12

The interlayer delamination height was measured by a dropping test of the bottle in accordance with ASTM D2463-95 Procedure B. A larger interlayer delamination height means better interlayer delamination resistance.

The bottle, which was filled with water and capped, was dropped, and the presence of interlayer delamination was visually determined. The bottle was dropped vertically, thereby making the bottom portion thereof into contact with the floor. The interval of the dropping height was 15 cm, and the number of containers tested was 30. The test was performed immediately after filling with water, and after 180 days from filling with water.

Examples 34 to 41 and Comparative Examples 13 to 18

In a cut specimen obtained by slicing the body of the cup, the delamination state upon peeling the oxygen absorbing barrier layer and the outer layer with hands was evaluated as follows. The test was performed immediately after molding, and after filling with water and storing for 180 days.

a: Resistance was observed upon peeling.
b: No resistance was observed upon peeling.

(3) Odor in Head Space Upon Opening

Examples 1 to 33 and Comparative Examples 1 to 12

The bottle was filled with 350 mL of distilled water as a content and sealed, and after storing at 25° C. for 1 month, the odor in the head space upon opening was sensorily evaluated.

Examples 34 to 41 and Comparative Examples 13 to 18

The cup was filled with 280 mL of distilled water as a content and sealed with an aluminum foil, and after storing at 25° C. for 1 month, the odor in the head space upon opening was sensorily evaluated.

In the evaluation method, the presence of offensive odor was evaluated by observing the odor inside the container immediately after opening by five panelists.

a: Completely no offensive odor was observed.
b: Offensive odor was observed even if only slightly.

Parison with Three-Layer Structure (B/A/B) and Biaxially Stretched Blow Molded Bottle Example 1

Under the following conditions, a material constituting the layer (B) was injected from the injection cylinder, then a material constituting the layer (A) was injected from another injection cylinder simultaneously with the resin constituting the layer (B), and then the resin constituting the layer (B) was injected in the necessary amount to fill the cavity, thereby providing an injection molded article (parison) (22.5 g) having a three-layer structure (B)/(A)/(B). The resin constituting the layer (B) used was polyethylene terephthalate (BK-2180, a trade name, produced by Japan Unipet Co., Ltd.) having an intrinsic viscosity of 0.83 (measured with a mixed solvent of phenol/tetrachloroethane=6/4 (mass ratio), measurement temperature: 30° C.). The resin constituting the layer (A) used was the polyamide resin 1 produced in Production Example 1.

After cooling the resulting parison, as the secondary processing, the parison was heated and subjected to biaxially stretching blow molding, thereby producing a bottle. The mass of the layer (A) was 5% by mass with respect to the total mass of the resulting bottle.

(Shape of Parison)

The parison had a total length of 95 mm, an outer diameter of 22 mm, a thickness of 2.7 mm, a thickness of the body of the outer layer (B) of 1,520 µm, a thickness of the body of the layer (A) of 140 µm, and a thickness of the body of the inner layer (B) of 1,040 µm. The parison was produced by using an injection molding machine (Model M200, produced by Meiki Co., Ltd., four-cavity model).

(Molding Conditions of Parison)

Injection cylinder temperature for layer (A): 250° C.
Injection cylinder temperature for layer (B): 280° C.

Mold resin flow path temperature: 280° C.
Mold cooling water temperature: 15° C.
(Shape of Bottle Obtained by Secondary Processing)

The bottle had a total length of 160 mm, an outer diameter of 60 mm, an inner capacity of 370 mL, a thickness of 0.28 mm, a thickness of the body of the outer layer (B) of 152 µm, a thickness of the body of the layer (A) of 14 µm, and a thickness of the body of the inner layer (B) of 114 µm. The stretching ratio was 1.9 times for the longitudinal direction and 2.7 times for the transversal direction. The bottom shape was a champagne type bottom. The bottle had dimples on the body. The secondary processing was performed by using a blow molding machine (Model EFB1000ET, produced by Frontier, Inc.).
(Secondary Processing Conditions)
Heating temperature for injection molded article: 100° C.
Pressure for stretching rod: 0.5 MPa
Primary blow pressure: 0.5 MPa
Secondary blow pressure: 2.4 MPa
Primary blow delay time: 0.32 sec
Primary blow time: 0.30 sec
Secondary blow time: 2.0 sec
Blow exhaust time: 0.6 sec
Mold temperature: 30° C.

Examples 2 to 9

Parisons and bottles were produced in the same manner as in Example 1 except that the resin constituting the layer (A) was changed to the polyamide resins 2 to 9 produced in Production Examples 2 to 9.

Comparative Example 1

A parison and a bottle were produced in the same manner as in Example 1 except that the resin constituting the layer (A) was changed to the polyamide resin 10 produced in Production Example 10.

Comparative Example 2

A parison and a bottle were produced in the same manner as in Example 1 except that a mixture obtained by dry-mixing 100 parts by mass of the polyamide resin 10 and 0.21 part by mass of cobalt(II) stearate was used as a resin composition constituting the layer (A).

Comparative Example 3

A parison and a bottle were produced in the same manner as in Example 1 except that a mixture obtained by dry-mixing 100 parts by mass of the polyamide resin 10, 0.15 part by mass of cobalt(II) stearate and 3 parts by mass of maleic acid-modified polybutadiene (M-2000-20, a trade name, produced by Nippon Petrochemicals Co., Ltd.) was used as a resin composition constituting the layer (A).

Examples 10 to 18

Parisons and bottles were produced in the same manner as in Examples 1 to 9 except that the mass of the layer (A) was changed to 10% by mass with respect to the total mass of the bottle. The thicknesses of the layers of the parison were a thickness of the body of the outer layer (B) of 1,460 µm, a thickness of the body of the layer (A) of 290 µm, and a thickness of the body of the inner layer (B) of 950 µm. The thicknesses of the layers of the bottle were a thickness of the body of the outer layer (B) of 146 µm, a thickness of the body of the layer (A) of 29 µm, and a thickness of the body of the inner layer (B) of 105 µm.

Comparative Examples 4 to 6

Parisons and bottles were produced in the same manner as in Comparative Examples 1 to 3 except that the mass of the layer (A) was changed to 10% by mass with respect to the total mass of the bottle. The thicknesses of the layers of the parison were a thickness of the body of the outer layer (B) of 1,460 µm, a thickness of the body of the layer (A) of 290 µm, and a thickness of the body of the inner layer (B) of 950 µm. The thicknesses of the layers of the bottle were a thickness of the body of the outer layer (B) of 146 µm, a thickness of the body of the layer (A) of 29 кm, and a thickness of the body of the inner layer (B) of 105 µm.

Parison with Five-Layer Structure (B/A/B/A/B) and Biaxially Stretched Blow Molded Bottle Example 19

A bottle was obtained in the same manner as in Example 1 except that, the layer structure of the multilayer injection molded article was changed to a five-layer structure (B)/(A)/(B)/(A)/(B) in such a manner that the material constituting the layer (B) was injected, then the material constituting the layer (A) was solely injected, and then the material constituting the layer (B) was finally injected in the necessary amount to fill the mold cavity. The thicknesses of the layers of the parison were, from the outside of the molded article, a thickness of the body of the layer (B) of 970 µm, a thickness of the body of the layer (A) of 80 µm, a thickness of the body of the layer (B) of 880 µm, a thickness of the body of the layer (A) of 60 µm, and a thickness of the body of the layer (B) of 710 µm. The thicknesses of the layers of the bottle were, from the outside of the molded article, a thickness of the body of the layer (B) of 99 µm, a thickness of the body of the layer (A) of 10 µm, a thickness of the body of the layer (B) of 90 µm, a thickness of the body of the layer (A) of 8 µm, and a thickness of the body of the layer (B) of 73 µm.

Examples 20 to 23

Parisons and bottles were produced in the same manner as in Example 19 except that the resin constituting the layer (A) was changed to the polyamide resins 2 to 5 produced in Production Examples 2 to 5.

Comparative Example 7

A parison and a bottle were produced in the same manner as in Example 19 except that the resin constituting the layer (A) was changed to the polyamide resin 10 produced in Production Example 10.

Comparative Example 8

A parison and a bottle were produced in the same manner as in Example 19 except that a mixture obtained by dry-mixing 100 parts by mass of the polyamide resin 10 and 0.21 part by mass of cobalt(II) stearate was used as a resin composition constituting the layer (A).

Comparative Example 9

A parison and a bottle were produced in the same manner as in Example 19 except that a mixture obtained by dry-mixing 100 parts by mass of the polyamide resin 10, 0.15 part by mass of cobalt(II) stearate and 3 parts by mass of maleic acid-modified polybutadiene (M-2000-20, a trade name, produced by Nippon Petrochemicals Co., Ltd.) was used as a resin composition constituting the layer (A).

Examples 24 to 28

Parisons and bottles were produced in the same manner as in Examples 19 to 23 except that the mass of the layer (A) was changed to 10% by mass with respect to the total mass of the bottle. The thicknesses of the layers of the parison were, from the outside of the molded article, a thickness of the body of the layer (B) of 910 µm, a thickness of the body of the layer (A) of 160 µm, a thickness of the body of the layer (B) of 830 µm, a thickness of the body of the layer (A) of 120 µm, and a thickness of the body of the layer (B) of 680 µm. The thicknesses of the layers of the bottle were, from the outside of the molded article, a thickness of the body of the layer (B) of 90 µm, a thickness of the body of the layer (A) of 21 µm, a thickness of the body of the layer (B) of 85 µm, a thickness of the body of the layer (A) of 17 and a thickness of the body of the layer (B) of 67 µm.

Comparative Examples 10 to 12

Parisons and bottles were produced in the same manner as in Comparative Examples 7 to 9 except that the mass of the layer (A) was changed to 10% by mass with respect to the total mass of the bottle. The thicknesses of the layers of the parison were, from the outside of the molded article, a thickness of the body of the layer (B) of 910 µm, a thickness of the body of the layer (A) of 160 µm, a thickness of the body of the layer (B) of 830 µm, a thickness of the body of the layer (A) of 120 µm, and a thickness of the body of the layer (B) of 680 µm. The thicknesses of the layers of the bottle were, from the outside of the molded article, a thickness of the body of the layer (B) of 90 µm, a thickness of the body of the layer (A) of 21 µm, a thickness of the body of the layer (B) of 85 µm, a thickness of the body of the layer (A) of 17 µm, and a thickness of the body of the layer (B) of 67 µm.

Parison with Five-Layer Structure (B1/B2/A/B2/B1) and Biaxially Stretched Blow Molded Bottle Example 29

Under the following conditions, a material constituting the layer (B) was injected, then a material constituting the layer (A) was solely injected, and then the resin constituting the layer (B) was finally injected in the necessary amount to fill the cavity, thereby providing an injection molded article (parison) (22.5 g) having a five-layer structure (B1)/(B2)/(A)/(B2)/(B1). The resin constituting the layer (B1) used was polyethylene terephthalate (BK-2180, a trade name, produced by Japan Unipet Co., Ltd.). The resin constituting the layer (B2) used was the polyamide resin 10 produced in Production Example 10. The resin constituting the layer (A) used was the polyamide resin 1 produced in Production Example 1.

After cooling the resulting parison, as the secondary processing, the parison was heated and subjected to biaxially stretching blow molding, thereby producing a bottle. The total mass of the layer (B2) was 5% by mass, and the mass of the layer (A) was 5% by mass, with respect to the total mass of the resulting bottle. The thicknesses of the layers of the parison were, from the outside of the molded article, a thickness of the body of the layer (B1) of 1,450 µm, a thickness of the body of the layer (B2) of 80 µm, a thickness of the body of the layer (A) of 140 µm, a thickness of the body of the layer (B2) of 90 µm, and a thickness of the body of the layer (B1) of 940 µm. The thicknesses of the layers of the bottle were, from the outside of the molded article, a thickness of the body of the layer (B1) of 146 µm, a thickness of the body of the layer (B2) of 9 µm, a thickness of the body of the layer (A) of 15 µm, a thickness of the body of the layer (B2) of 9 µm, and a thickness of the body of the layer (B1) of 101 µm.

(Molding Conditions of Parison)

Injection cylinder temperature for layer (A): 250° C.

Injection cylinder temperature for layer (B1): 280° C.

Injection cylinder temperature for layer (B2): 280° C.

Mold resin flow path temperature: 280° C.

Mold cooling water temperature: 15° C.

The shape of the parison, the injection molding machine used for producing the parison, the shape of the bottle obtained by the secondary processing, the biaxially stretching blow conditions, and the blow molding machine used for producing the bottle were the same as in Example 1.

Examples 30 to 33

Parisons and bottles were produced in the same manner as in Example 29 except that the resin constituting the layer (A) was changed to the polyamide resins 2 to 5 produced in Production Examples 2 to 5.

Injection Cup with Three-Layer Structure (B/A/B)

Example 34

A multilayer injection molded article (cup) (20.5 g) having a layer structure (B)/(A)/(B) was obtained by injection molding under the following conditions. The resin constituting the layer (B) used was polypropylene (Novatec MG03E, a trade name, produced by Japan Polypropylene Corporation, random polymer, MFR: 30). The resin constituting the layer (A) used was the polyamide resin 1 produced in Production Example 1. The mass of the layer (A) was 10% by mass with respect to the total mass of the resulting cup.

(Shape of Cup)

The cup had a total length of 125 mm, a bottom diameter of 52 mm, a flange outer diameter of 70 mm, a flange inner diameter of 62 mm, a thickness of 1.1 mm, an internal capacity of 320 mL, a thickness of the body of the outer layer (B) of 530 µm, a thickness of the body of the layer (A) of 100 µm, and a thickness of the body of the inner layer (B) of 470 µm. The cup was produced by using an injection molding machine (Model M200, produced by Meiki Co., Ltd., four-cavity model).

(Molding Conditions of Cup)

Injection cylinder temperature for layer (A): 250° C.

Injection cylinder temperature for layer (B): 240° C.

Mold resin flow path temperature: 250° C.

Mold cooling water temperature: 15° C.

Examples 35 to 38

Cups were produced in the same manner as in Example 34 except that the resin constituting the layer (A) was changed to the polyamide resins 2 to 5 produced in Production Examples 2 to 5.

Comparative Example 13

A cup was produced in the same manner as in Example 34 except that the resin constituting the layer (A) was changed to the polyamide resin 10 produced in Production Example 10.

Comparative Example 14

A cup was produced in the same manner as in Example 34 except that a mixture obtained by dry-mixing 100 parts by mass of the polyamide resin 10 and 0.21 part by mass of cobalt(II) stearate was used as a resin composition constituting the layer (A).

Comparative Example 15

A cup was produced in the same manner as in Example 34 except that a mixture obtained by dry-mixing 100 parts by mass of the polyamide resin 10, 0.15 part by mass of cobalt(II) stearate and 3 parts by mass of maleic acid-modified polybutadiene (M-2000-20, a trade name, produced by Nippon Petrochemicals Co., Ltd.) was used as a resin composition constituting the layer (A).

Injection Cup with Three-Layer Structure (B/A/B)

Example 39

A multilayer injection molded article (cup) (30.5 g) having a layer structure (B)/(A)/(B) was obtained by injection molding under the following conditions. The resin constituting the layer (B) used was polyethylene terephthalate (BK-2180, a trade name, produced by Japan Unipet Co., Ltd.) having an intrinsic viscosity of 0.83 (measured with a mixed solvent of phenol/tetrachloroethane=6/4 (mass ratio), measurement temperature: 30° C.). The resin constituting the layer (A) used was the polyamide resin 1 produced in Production Example 1. The mass of the layer (A) was 10% by mass with respect to the total mass of the resulting cup.

(Shape of Cup)

The cup had a total length of 125 mm, a bottom diameter of 52 mm, a flange outer diameter of 70 mm, a flange inner diameter of 62 mm, a thickness of 1.1 mm, an internal capacity of 320 mL, a thickness of the body of the outer layer (B) of 530 μm, a thickness of the body of the layer (A) of 100 μm, and a thickness of the body of the inner layer (B) of 470 μm. The cup was produced by using an injection molding machine (Model M200, produced by Meiki Co., Ltd., four-cavity model).

(Molding Conditions of Cup)
Injection cylinder temperature for layer (A): 280° C.
Injection cylinder temperature for layer (B): 280° C.
Mold resin flow path temperature: 280° C.
Mold cooling water temperature: 15° C.

Examples 40 and 41

Cups were produced in the same manner as in Example 39 except that the resin constituting the layer (A) was changed to the polyamide resins 2 and 3 produced in Production Examples 2 and 3.

Comparative Example 16

A cup was produced in the same manner as in Example 39 except that the resin constituting the layer (A) was changed to the polyamide resin 10 produced in Production Example 10.

Comparative Example 17

A cup was produced in the same manner as in Example 39 except that a mixture obtained by dry-mixing 100 parts by mass of the polyamide resin 10 and 0.21 part by mass of cobalt(II) stearate was used as a resin composition constituting the layer (A).

Comparative Example 18

A cup was produced in the same manner as in Example 39 except that a mixture obtained by dry-mixing 100 parts by mass of the polyamide resin 10, 0.15 part by mass of cobalt(II) stearate and 3 parts by mass of maleic acid-modified polybutadiene (M-2000-20, a trade name, produced by Nippon Petrochemicals Co., Ltd.) was used as a resin composition constituting the layer (A).

Tables 2 to 4 show the measurement results of OTR and the evaluation results of the interlayer delamination resistance and the odor in the head space upon opening of the bottles and cups.

TABLE 2

| | Polyamide resin No. of Layer (A) | Layer structure | Mass of layer (A) (% by mass) | Oxygen transmission rate (mL/0.21 atm · day · package) | | | | Interlayer delamination height (cm) | | Odor in head space |
|---|---|---|---|---|---|---|---|---|---|---|
| | | | | 1 day | 7 days | 15 days | 30 days | Immediately after filling with water | After storing for 180 days from filling with water | |
| Example 1 | 1 | three layers*[3] | 5 | 0.0001 | 0.0003 | 0.0007 | 0.0038 | 280 | 130 | a |
| Example 2 | 2 | | 5 | 0.0001 | 0.0003 | 0.0008 | 0.0031 | 295 | 150 | a |
| Example 3 | 3 | | 5 | 0.0001 | 0.0002 | 0.0004 | 0.0017 | 310 | 175 | a |
| Example 4 | 4 | | 5 | 0.0001 | 0.0001 | 0.0006 | 0.0010 | 300 | 165 | a |
| Example 5 | 5 | | 5 | 0.0001 | 0.0001 | 0.0008 | 0.0036 | 285 | 140 | a |
| Example 6 | 6 | | 5 | 0.0001 | 0.0002 | 0.0009 | 0.0032 | 330 | 220 | a |
| Example 7 | 7 | | 5 | 0.0001 | 0.0003 | 0.0008 | 0.0031 | 330 | 205 | a |
| Example 8 | 8 | | 5 | 0.0001 | 0.0002 | 0.0006 | 0.0029 | 290 | 180 | a |
| Example 9 | 9 | | 5 | 0.0001 | 0.0003 | 0.0009 | 0.0027 | 300 | 170 | a |
| Comparative Example 1 | 10 | | 5 | 0.0178 | 0.0176 | 0.0176 | 0.0175 | 220 | 115 | a |

TABLE 2-continued

| | Polyamide resin No. of Layer (A) | Layer structure | Mass of layer (A) (% by mass) | Oxygen transmission rate (mL/0.21 atm · day · package) | | | | Interlayer delamination height (cm) | | Odor in head space |
|---|---|---|---|---|---|---|---|---|---|---|
| | | | | 1 day | 7 days | 15 days | 30 days | Immediately after filling with water | After storing for 180 days from filling with water | |
| Comparative Example 2 | 10*1 | | 5 | 0.0001 | 0.0001 | 0.0001 | 0.0001 | 230 | 15 | a |
| Comparative Example 3 | 10*2 | | 5 | 0.0001 | 0.0001 | 0.0001 | 0.0001 | 215 | 15 | b |
| Example 10 | 1 | | 10 | 0.0001 | 0.0001 | 0.0003 | 0.0022 | 280 | 140 | a |
| Example 11 | 2 | | 10 | 0.0001 | 0.0001 | 0.0002 | 0.0015 | 270 | 130 | a |
| Example 12 | 3 | | 10 | 0.0001 | 0.0001 | 0.0001 | 0.0007 | 285 | 125 | a |
| Example 13 | 4 | | 10 | 0.0001 | 0.0001 | 0.0001 | 0.0004 | 270 | 160 | a |
| Example 14 | 5 | | 10 | 0.0001 | 0.0001 | 0.0003 | 0.0016 | 265 | 155 | a |
| Example 15 | 6 | | 10 | 0.0001 | 0.0001 | 0.0010 | 0.0018 | 270 | 125 | a |
| Example 16 | 7 | | 10 | 0.0001 | 0.0001 | 0.0003 | 0.0018 | 300 | 180 | a |
| Example 17 | 8 | | 10 | 0.0001 | 0.0002 | 0.0004 | 0.0020 | 285 | 150 | a |
| Example 18 | 9 | | 10 | 0.0001 | 0.0002 | 0.0005 | 0.0019 | 310 | 160 | a |
| Comparative Example 4 | 10 | | 10 | 0.0087 | 0.0086 | 0.0086 | 0.0085 | 210 | 105 | a |
| Comparative Example 5 | 10*1 | | 10 | 0.0001 | 0.0001 | 0.0001 | 0.0001 | 225 | 15 | a |
| Comparative Example 6 | 10*2 | | 10 | 0.0001 | 0.0001 | 0.0001 | 0.0001 | 225 | 15 | b |
| Example 19 | 1 | five layers*4 | 5 | 0.0001 | 0.0003 | 0.0009 | 0.0039 | 330 | 145 | a |
| Example 20 | 2 | | 5 | 0.0001 | 0.0003 | 0.0008 | 0.0033 | 295 | 160 | a |
| Example 21 | 3 | | 5 | 0.0001 | 0.0003 | 0.0005 | 0.0021 | 320 | 155 | a |
| Example 22 | 4 | | 5 | 0.0001 | 0.0002 | 0.0007 | 0.0012 | 310 | 155 | a |
| Example 23 | 5 | | 5 | 0.0001 | 0.0003 | 0.0008 | 0.0034 | 320 | 170 | a |
| Comparative Example 7 | 10 | | 5 | 0.0184 | 0.0183 | 0.0183 | 0.0182 | 225 | 100 | a |
| Comparative Example 8 | 10*1 | | 5 | 0.0001 | 0.0001 | 0.0001 | 0.0001 | 245 | 15 | a |
| Comparative Example 9 | 10*2 | | 5 | 0.0001 | 0.0001 | 0.0001 | 0.0001 | 230 | 15 | b |
| Example 24 | 1 | five layers*4 | 10 | 0.0001 | 0.0001 | 0.0003 | 0.0023 | 305 | 150 | a |
| Example 25 | 2 | | 10 | 0.0001 | 0.0001 | 0.0002 | 0.0017 | 315 | 140 | a |
| Example 26 | 3 | | 10 | 0.0001 | 0.0001 | 0.0001 | 0.0008 | 250 | 175 | a |
| Example 27 | 4 | | 10 | 0.0001 | 0.0001 | 0.0001 | 0.0005 | 280 | 165 | a |
| Example 28 | 5 | | 10 | 0.0001 | 0.0001 | 0.0003 | 0.0017 | 290 | 150 | a |
| Comparative Example 10 | 10 | | 10 | 0.0092 | 0.0090 | 0.0089 | 0.0089 | 220 | 95 | a |
| Comparative Example 11 | 10*1 | | 10 | 0.0001 | 0.0001 | 0.0001 | 0.0001 | 215 | 15 | a |
| Comparative Example 12 | 10*2 | | 10 | 0.0001 | 0.0001 | 0.0001 | 0.0001 | 220 | 15 | b |
| Example 29 | 1 | five layers*5 | 5 | 0.0001 | 0.0001 | 0.0002 | 0.0015 | 270 | 160 | a |
| Example 30 | 2 | | 5 | 0.0001 | 0.0001 | 0.0001 | 0.0008 | 275 | 140 | a |
| Example 31 | 3 | | 5 | 0.0001 | 0.0001 | 0.0001 | 0.0004 | 265 | 125 | a |
| Example 32 | 4 | | 5 | 0.0001 | 0.0001 | 0.0001 | 0.0003 | 280 | 130 | a |
| Example 33 | 5 | | 5 | 0.0001 | 0.0001 | 0.0001 | 0.0007 | 260 | 125 | a |

*1 cobalt(II) stearate added to polyamide resin of layer (A)
*2 cobalt(II) stearate and maleic acid-modified polybutadiene added to polyamide resin of layer (A)
*3 layer (B)/layer (A)/layer (B) = PET/polyamide resin (A)/PET
*4 layer (B)/layer (A)/layer (B)/layer (A)/layer (B) = PET/polyamide resin (A)/PET/polyamide resin (A)/PET
*5 layer (B1)/layer (B2)/layer (A)/layer (B2)/layer (B1) = PET/N-MXD6/polyamide resin (A)/N-MXD6/PET

TABLE 3

| | Polyamide resin No. of Layer (A) | Layer structure | Mass of layer (A) (% by mass) | Oxygen transmission rate (mL/0.21 atm · day · package) | | | | Interlayer delamination resistance test | | Odor in head space |
|---|---|---|---|---|---|---|---|---|---|---|
| | | | | 1 day | 7 days | 15 days | 30 days | Immediately after molding | After storing for 180 days from filling with water | |
| Example 34 | 1 | three layers*6 | 10 | 0.0021 | 0.0027 | 0.0036 | 0.0045 | a | a | a |
| Example 35 | 2 | | 10 | 0.0012 | 0.0014 | 0.0020 | 0.0026 | a | a | a |
| Example 36 | 3 | | 10 | 0.0006 | 0.0008 | 0.0012 | 0.0017 | a | a | a |
| Example 37 | 4 | | 10 | 0.0003 | 0.0005 | 0.0008 | 0.0011 | a | a | a |
| Example 38 | 5 | | 10 | 0.0010 | 0.0012 | 0.0019 | 0.0027 | a | a | a |

TABLE 3-continued

| | Polyamide resin No. of Layer (A) | Layer structure | Mass of layer (A) (% by mass) | Oxygen transmission rate (mL/0.21 atm·day·package) | | | | Interlayer delamination resistance test | | Odor in head space |
|---|---|---|---|---|---|---|---|---|---|---|
| | | | | 1 day | 7 days | 15 days | 30 days | Immediately after molding | After storing for 180 days from filling with water | |
| Comparative Example 13 | 10 | three layers*6 | 10 | 0.0076 | 0.0075 | 0.0074 | 0.0074 | b | b | a |
| Comparative Example 14 | 10*1 | | 10 | 0.0001 | 0.0001 | 0.0001 | 0.0001 | b | b | a |
| Comparative Example 15 | 10*2 | | 10 | 0.0001 | 0.0001 | 0.0001 | 0.0001 | b | b | b |

*1 cobalt(II) stearate added to polyamide resin of layer (A)
*2 cobalt(II) stearate and maleic acid-modified polybutadiene added to polyamide resin of layer (A)
*6 layer (B)/layer (A)/layer (B) = PP/polyamide resin (A)/PP

TABLE 4

| | Polyamide resin No. of Layer (A) | Layer structure | Mass of layer (A) (% by mass) | Oxygen transmission rate (mL/0.21 atm·day·package) | | | | Interlayer delamination resistance test | | Odor in head space |
|---|---|---|---|---|---|---|---|---|---|---|
| | | | | 1 day | 7 days | 15 days | 30 days | Immediately after molding | After storing for 180 days from filling with water | |
| Example 39 | 1 | three layers*6 | 10 | 0.0012 | 0.0018 | 0.0025 | 0.0032 | a | a | a |
| Example 40 | 2 | | 10 | 0.0007 | 0.0011 | 0.0015 | 0.0021 | a | a | a |
| Example 41 | 3 | | 10 | 0.0003 | 0.0005 | 0.0009 | 0.0012 | a | a | a |
| Comparative Example 16 | 10 | three layers*6 | 10 | 0.0056 | 0.0055 | 0.0054 | 0.0054 | b | b | a |
| Comparative Example 17 | 10*1 | | 10 | 0.0001 | 0.0001 | 0.0001 | 0.0001 | b | b | a |
| Comparative Example 18 | 10*2 | | 10 | 0.0001 | 0.0001 | 0.0001 | 0.0001 | b | b | b |

*1 cobalt(II) stearate added to polyamide resin of layer (A)
*2 cobalt(II) stearate and maleic acid-modified polybutadiene added to polyamide resin of layer (A)
*6 layer (B)/layer (A)/layer (B) = PET/polyamide resin (A)/PET The bottles and cups of Examples 1 to 41 are all excellent in oxygen barrier property and interlayer delamination resistance, undergo considerably small decrease of the strength of the oxygen absorbing barrier layer with the lapse of time, and are difficult to suffer interlayer delamination in utilization for a prolonged period of time.

In the comparative examples where cobalt stearate or maleic acid-modified polybutadiene is used for improving the oxygen transmission rate, on the other hand, although the oxygen barrier property is excellent, the interlayer delamination resistance is lowered due to oxidative decomposition of the resin by the cobalt catalyst with the lapse of time. In the comparative examples using maleic acid-modified polybutadiene, in particular, offensive odor occurs upon opening due to the generation of low molecular weight compounds through oxidative degradation of the polybutadiene.

INDUSTRIAL APPLICABILITY

The multilayer injection molded article and the container obtained by processing the same of the present invention may be favorably used as a packaging material.

The invention claimed is:
1. A multilayer injection molded article, comprising:
a layer (A) comprising a polyamide resin (A), and
a layer (B) comprising a resin (B) as a major component, wherein the polyamide resin (A) comprises:

from 25 to 50% by mol of a diamine unit, which comprises at least one diamine unit selected from the group consisting of an aromatic diamine unit of formula (I-1), and an alicyclic diamine unit of formula (I-2), in an amount of 50% by mol or more based on a total amount of the diamine unit;

from 25 to 50% by mol of a dicarboxylic acid unit, which comprises a linear aliphatic dicarboxylic acid unit of formula (II-1), an aromatic dicarboxylic acid unit of formula (II-2), or both, in an amount of 50% by mol or more based on a total amount of the dicarboxylic acid unit; and from 0.1 to 50% by mol of a constitutional unit of formula (III):

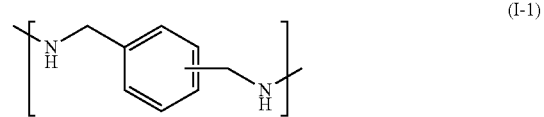

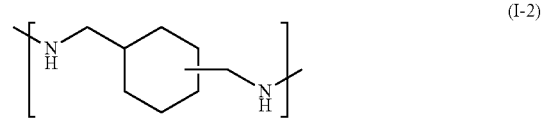

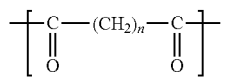
(II-1)

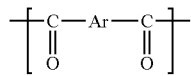
(II-2)

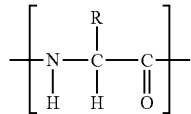
(III)

wherein
n is an integer of from 2 to 18;
Ar is an arylene group; and
R is a substituted or an unsubstituted alkyl group or a substituted or an unsubstituted aryl group.

2. The multilayer injection molded article according to claim 1, wherein R in formula (III) is a substituted or an unsubstituted alkyl group comprising from 1 to 6 carbon atoms or a substituted or an unsubstituted aryl group comprising from 6 to 10 carbon atoms.

3. The multilayer injection molded article according to claim 1, wherein the diamine unit comprises an m-xylylenediamine unit in an amount of 50% by mol or more based on the total amount of the diamine unit.

4. The multilayer injection molded article according to claim 1, wherein the dicarboxylic acid unit comprises the linear aliphatic dicarboxylic acid unit (II-1), which comprises at least one selected from the group consisting of an adipic acid unit, a sebacic acid unit and a 1,12-dodecanedicarboxylic acid unit, in an amount of 50% by mol or more based on the total amount of the dicarboxylic acid unit.

5. The multilayer injection molded article according to claim 1, wherein the dicarboxylic acid unit comprises the aromatic dicarboxylic acid unit (II-2), which comprises at least one selected from the group consisting of an isophthalic acid unit, a terephthalic acid unit and a 2,6-naphthalenedicarboxylic acid unit, in an amount of 50% by mol or more based on the total amount of the dicarboxylic acid unit.

6. The multilayer injection molded article according to claim 1, wherein the polyamide resin (A) further comprises an ω-aminocarboxylic acid unit of formula (X) in an amount of from 0.1 to 49.9% by mol based on a total mols of constitutional units of the polyamide resin (A):

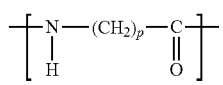
(X)

wherein p is an integer of from 2 to 18.

7. The multilayer injection molded article according to claim 6, wherein the ω-aminocarboxylic acid unit comprises at least one of a 6-aminohexanoic acid unit and a 12-aminododecanoic acid unit in an amount of 50% by mol or more based on a total amount of the ω-aminocarboxylic acid unit.

8. The multilayer injection molded article according to claim 1, wherein a relative viscosity of the polyamide resin (A) is from 1.8 to 4.2.

9. A container obtained by processing the multilayer injection molded article according to claim 1.

10. The container according to claim 9, wherein the container is obtained by stretching blow molding.

11. The multilayer injection molded article according to claim 1, wherein the polyamide resin (A) is a crystalline polyamide.

* * * * *